(12) United States Patent
Zhong

(10) Patent No.: US 11,144,333 B2
(45) Date of Patent: Oct. 12, 2021

(54) SERVICE MODEL-ORIENTED SOFTWARE SYSTEM AND OPERATION METHOD THEREOF

(71) Applicant: TONGLING YUCHENG SOFTWARE TECHNOLOGY CO., LTD, Anhui (CN)

(72) Inventor: Wenxiang Zhong, Anhui (CN)

(73) Assignee: TONGLING YUCHEN SOFTWARE TECHNOLOGY CO., LTD., Anhui (CN)

( * ) Notice: Subject to any disclaimer, the term of this patent is extended or adjusted under 35 U.S.C. 154(b) by 42 days.

(21) Appl. No.: 16/177,747

(22) Filed: Nov. 1, 2018

(65) Prior Publication Data
US 2019/0073227 A1    Mar. 7, 2019

Related U.S. Application Data

(63) Continuation-in-part of application No. 14/594,071, filed on Jan. 9, 2015, now abandoned, which is a continuation-in-part of application No. 14/004,673, filed as application No. PCT/CN2012/076894 on Jun. 14, 2012, now abandoned.

(30) Foreign Application Priority Data

Jul. 12, 2011    (CN) .......................... 201110193036.2

(51) Int. Cl.
*G06F 9/448*    (2018.01)
*G06F 9/445*    (2018.01)

(52) U.S. Cl.
CPC ............ *G06F 9/4492* (2018.02); *G06F 9/445* (2013.01); *G06F 9/4488* (2018.02)

(58) Field of Classification Search
None
See application file for complete search history.

(56) References Cited

U.S. PATENT DOCUMENTS

| 6,442,557 B1 * | 8/2002 | Buteau | G06Q 30/0201 |
| | | | 705/7.29 |
| 6,895,586 B1 * | 5/2005 | Brasher | G06F 9/465 |
| | | | 709/201 |

(Continued)

*Primary Examiner* — Matthew J Brophy

(57) ABSTRACT

A service model-oriented software system and an operation method of the present invention take a service module object as a basic component to drive the software system to run; support componentized software running and development, provide loose coupling, good openness and high security and is easy to be expanded. The software system includes a server-sided system architecture and a client-sided system architecture; the server-sided system architecture includes a service model factory component, a service model control engine and an activity service model component; the client-sided system architecture includes a client-sided control engine, a data object agent component and a view component. The software system and the operation method thereof lay a solid foundation for the development of the service-oriented software technology, provide solutions for the development of the computer software system in the cloud environment, and open new ideas and methods for the development and application of the software.

14 Claims, 11 Drawing Sheets

(56) References Cited

U.S. PATENT DOCUMENTS

| | | | |
|---|---|---|---|
| 7,581,205 B1* | 8/2009 | Massoudi | G06F 8/34 717/106 |
| 7,684,964 B2* | 3/2010 | Outhred | G06F 9/4492 703/2 |
| 7,886,041 B2* | 2/2011 | Outhred | H04L 67/1002 709/224 |
| 8,291,059 B2* | 10/2012 | Mogalayapalli | G06F 9/485 709/223 |
| 8,930,887 B2* | 1/2015 | Salle | G06F 8/34 717/104 |
| 9,203,774 B2* | 12/2015 | Arwe | H04L 29/08153 |
| 9,432,247 B2* | 8/2016 | Arwe | H04L 67/10 |
| 9,515,866 B2* | 12/2016 | Arwe | H04L 67/1004 |
| 9,787,528 B2* | 10/2017 | Arwe | G06F 9/5005 |
| 10,135,669 B2* | 11/2018 | Arwe | G06F 9/5016 |
| 2006/0242195 A1* | 10/2006 | Bove | G06F 8/36 |
| 2007/0106761 A1* | 5/2007 | Beoughter | G05B 19/0426 709/219 |
| 2009/0083341 A1* | 3/2009 | Parees | G06F 16/2365 |
| 2011/0004862 A1* | 1/2011 | Kejriwal | G06F 8/10 717/104 |
| 2011/0307590 A1* | 12/2011 | Mogalayapalli | G06F 9/485 709/223 |
| 2012/0124565 A1* | 5/2012 | Salle | G06F 8/61 717/162 |
| 2013/0036222 A1* | 2/2013 | Mogalayapalli | G06Q 10/06314 709/224 |
| 2014/0006627 A1* | 1/2014 | Arwe | H04L 47/70 709/226 |
| 2014/0007040 A1* | 1/2014 | Zhong | G06F 8/00 717/104 |
| 2014/0095721 A1* | 4/2014 | Arwe | H04L 67/10 709/226 |
| 2015/0149980 A1* | 5/2015 | Zhong | G06F 8/20 717/105 |
| 2015/0261524 A1* | 9/2015 | He | G06F 11/3034 717/120 |
| 2015/0356111 A1* | 12/2015 | Kalsi | G06F 16/275 707/610 |
| 2016/0072661 A1* | 3/2016 | Arwe | H04L 41/5051 709/223 |
| 2016/0077807 A1* | 3/2016 | Newman | G06F 9/5072 717/104 |
| 2016/0344840 A1* | 11/2016 | Arwe | G06F 9/4492 |
| 2018/0026828 A1* | 1/2018 | Arwe | H04L 67/10 709/226 |
| 2019/0073227 A1* | 3/2019 | Zhong | G06F 9/4492 |

* cited by examiner

Fig. 7

```xml
<?xml version="1.0" encoding="UTF-8"?>
<module name="bill_sales" initView="desk" isPublic="true" isActive="true"
  lifeCycle="keep" allowAccess="true" rights="" abstract="false" parent="bill" >
</module>
```
— 4501

```xml
<?xml version="1.0" encoding="UTF-8"?>
<action-cfg>
        <action name="Save" rights="" lifeCycle="session"/>
        <action name="Edit" rights="" lifeCycle="module"/>
        <action name="Add" rights="" lifeCycle="share"/>
</action-cfg>
```
— 4502

```xml
<?xml version="1.0" encoding="UTF-8"?>
<mdo name="bill" static="false" updateType="update" updateTableName="SALES_BILL"
        primaryColumns="BillID" syncColumns="SaleDate,Customer,TotalCharges,TotalTaxes"
        dependDO="" dependColumns="" targetColumns="" protectedColumns="SaleDate"
        updateColumns="BillID,SaleDate,Customer,TotalCharges,TotalTaxes" pageRows="1" >
    <QueryText> <![CDATA[SELECT BillID,SaleDate,Customer,TotalCharges,
        TotalTaxes FROM SALES_BILL WHERE BillID=?]]> </QueryText>
</mdo>
```
— 4511

```xml
<?xml version="1.0" encoding="UTF-8"?>
<view className="view view_dialog" style="width: 440px; height: 230px;"
  name="bill.dialog" type="view_dialog" modal="true" >
  <children> <![CDATA[{body:"bill.content"}]]> </children>
  <html> <![CDATA[<div class="dlg-title-content" view-band="header" >
        <div class="dlg-head view_drag" ><span class="dlg-title view_drag"
        view-band="title" >Add sales</span><i class="fa fa-close dlg-close-btn" >
        </i> </div> </div> <div class="dlg-body" view-area="body" > </div>]]> </html>
</view>
```
— 4323

```xml
<?xml version="1.0" encoding="UTF-8"?>
<view name="bill.content" type="view_container">
    <children> <![CDATA[{body:"bill.button,bill.free"}]]> </children>
    <html> <![CDATA[<div class="view-area cols24" view-area="body" > </div>]]></html>
    <extend> <![CDATA[{}]]> </extend>
</view>
```
— 4322

```xml
<?xml version="1.0" encoding="UTF-8"?>
<view className="view view_button" style="" name="bill.button" type="view_button" >
  <html> <![CDATA[<div class="view_button" view-band="body" > </div>]]> </html>
  <buttons>
    <button name="cancel" rights="" group="" >
      <html> <![CDATA[<button type="button">Cancel</button>]]> </html>
      <extend> <![CDATA[{done:function(){this.getView("bill.dialog").close();}}]]> </extend>
    </button>
    <button name="Save" rights="" group="" >
      <html> <![CDATA[<button type="button">Add</button>]]> </html>
      <extend> <![CDATA[{done:function(){
       var options = {
         success: {
           method: function () {alert("Save successful !")},
           context:this
         }
       };
       this.call("Save", "bill","",options);
      }}]]> </extend>
    </button>
  </buttons>
</view>
```
— 4321, 7010

Fig. 7A

```xml
<? xml version="1.0" encoding="UTF-8"?>
<view className="view view_free" name="bill.free" adoName="bill"
    type="view_free" onLoadAction="">
    <html> <![CDATA[<div view-band="body">
        <table class="free-table"> <tbody>
            <tr>
                <td><div><span>Sale Date: </span></div></td>
                <td><div data-name="SaleDate"><div><input type="text"></div></div></td>
            </tr>
            <tr>
                <td><div><div><span>Customer: </span></div></div></td>
                <td><div data-name="Customer"><div><div><span><i class="fa fa-caret-down">
                </i></span><input placeholder="" type="text"></div></div></div></td>
            </tr>
            <tr>
                <td><div><div><span>TotalCharges($): </span></div></div></td>
                <td><div data-name="TotalCharges"><div><input type="text"></div></div></td>
            </tr>
            <tr>
                <td><div><div><span>Total Taxes($): </span></div></div></td>
                <td><div data-name="Total Taxes"><div><input type="text"></div></div></td>
            </tr>
        </tbody></table>
    </div>]]> </html>
    <fields>
        <field name="SaleDate" type="text" formatText=""></field>
        <field name="Customer" type="combobox" formatText=""></field>
        <field name="TotalCharges" type="number" formatText=""></field>
        <field name="TotalTaxes" type="number" formatText=""></field>
    </fields>
</view>
```
— 4524

```java
package bill;
import yc.cloud.engine.ActiveModule;
public class Add extends AbstractCallAction {
    public void before(ActiveModule am) throws Exception {
        am.openEditADOs(new String[] { "bill" });
    }
    public void call(ActiveModule am) throws Exception {
        try{
            ActiveDataObject ado_bill=am.getActiveDataObject("bill");
            //check
            //ado_bill.save();
            //commit
        }catch(Exception e){
            //rollback;
        }
    }
    public void after(ActiveModule am) throws Exception {
        //log...
    }
}
```
— 4335, 7020

Fig. 7B

SERVICE MODEL-ORIENTED SOFTWARE SYSTEM AND OPERATION METHOD THEREOF

CROSS REFERENCE OF RELATED APPLICATION

This is a Continuation-In-Parts application of the U.S. application Ser. No. 14/594,071, filed on Jan. 9, 2015; the U.S. application Ser. No. 14/594,071 is a Continuation-In-Parts application of the U.S. application Ser. No. 14/004,673, filed on Sep. 11, 2013; the U.S. application Ser. No. 14/004,673 is a U.S. National Stage under 35 U.S.C 371 of the International Application PCT/CN2012/076894, filed on Jun. 14, 2012, which claims priority under 35 U.S.C. 119 (a-d) to CN 201110193036.2, filed on Jul. 12, 2011.

BACKGROUND OF THE PRESENT INVENTION

Field of Invention

The present invention relates to the field of computer technology, and more particularly to a service model-oriented software structure and an operation method thereof in a computer software system.

Description of Related Arts

The software system operation and development technology has experienced a process-oriented and object-oriented development stage, and is currently developing in the direction of component-oriented and service-oriented. The object-oriented features have been widely supported, but with the development of Internet/Intranet technology, the object-oriented technology has been difficult to meet the demands of flexible Internet/Intranet software technology due to its tight coupling and closed features. The application of PaaS (Platform as a Service) is developed very fast, but the current mainstream PaaS software is basically built around traditional technologies and platforms. The software layered structure MVC (Model-View-Controller) and the evolved MVVM (Model-View-ViewModel) based on the MVC, to some extent, simplify software design and development, but there is no complete and systematic solution for lifecycle management, data management and resource scheduling of software component. Traditional software design and development deeply rely on technology and architecture, are not centered on service needs, are low in the reuse rate of software code, are difficult to achieve the independence and packaging of service layer functional components and expand, are poor in overall performance and have many security risks. At present, most Web software systems are based on forms, which need to frequently refresh pages, and are large in data traffic of network interaction, so that it is difficult to implement and meet complex interactive views and functional requirements. Especially, during the software running process, when it is necessary to partially modify business logic codes or update the existing bugs, it is often necessary to stop the entire Web software system, which is costly and difficult for the user to accept. On the other hand, because the codes cannot be partially updated, the software system development, testing, and release are very inconvenient, and especially the team members do not have unified, shared software development, test real-time environment, are difficult to be managed and coordinated, have high cost and low efficiency, seriously restricting the development of software technology, and especially flexible Internet/Intranet software technology.

SUMMARY OF THE PRESENT INVENTION

An object of the present invention is to disclose a service-oriented model software system and an operation method thereof, which utilizes business requirement characteristics and content to divide business logic, build a service module, takes a service module object as a basic component to drive the software system to run; supports componentized software running and development, provides loose coupling, good openness, high performance and high security and is easy to be expanded. Moreover, the codes of the software system are partially updated without stopping running the entire software system; the software system provided by the present invention supports directly submitting source code files, automatic compilation and operation, has simple structure, high development efficiency and low maintenance cost, is easy to be expanded.

To achieve the above object, the present invention provides a software system which comprises a service module object organization structure, a service module object inheritance rule and a software architecture for supporting a service module object to run, wherein the software architecture comprises a server-sided system architecture and a client-sided system architecture;

the service module object organization structure comprises service module object attribute, member object, service module activity configuration;

the service module object attribute comprises name of service model, name of initial view component, public identifier, activation identifier, life cycle identifier, access verification identifier, authorized alias, abstract service module identifier and name of parent service module;

the member object comprises data object, view description component object, service module activity object and other resource objects, wherein the data object is description of service entity, the view description component object is definition of various types of views on a client-side, the service module activity object are command actions for system internal, client-side, and system external access;

the service module activity configuration are property settings for service module activity object owned or inherited by the service module object and comprise service activity name, access authorization name and lifecycle attribute;

the service module object inheritance rule comprises direct inheritance and indirect inheritance, wherein:

the direct inheritance means that the service module object is inherited by specifying the name of parent service module for the service module object; when the name of parent service module is specified, a sub service module object inherits all member objects of the specified parent service module object; when the sub service module object has member objects with same types and names with the parent service module object, the component objects with the same types and names of the parent service module object are covered;

the indirect inheritance means that the service module object is inherited through the view description component object defined in the service module object and linked with other abstract service module objects; while defining the view description component object linked with other abstract service module objects for the service module object, component objects related with the linked abstract service module object are aggregated to a current service module object; when the current service module object (including a service module object obtained by direct inheritance) has member objects with same types and names with the linked abstract service module object, the member objects of the linked abstract service module object with the same types and same names are covered, which is as same as a covering method of specifying the name of parent service module and comply with member object precedence principle of the direct inheritance, so that the indirect inheritance realizes multiple inheritance of the service module object;

based on the rule, the service module object autonomously parses and loads the member objects owned by the service module object for external or internal access and call by the service module object;

the server-sided system architecture comprises:

a service module object factory configured to search service module definition in the software system based on a name of service module and provide class compiling services; according to searched resource files or resource data, to create and manage a service module object, wherein: when creating the service module object, a member object defined in the service module object is simultaneously created and service module activity configuration information is read out, wherein the member object comprises data object accessed by names, view description component object, service module activity object and other resource objects;

a service module control engine configured to receive client-sided or other external accesses, provide session security authentication service, uniformly manage (including query, create, cache, call, and release) an instance of a private activity service module context object and an instance of a public activity service module context object, wherein: a service module object is searched from the service module object factory according to a name of an activity service module group of an access request, if the public identifier of the service module object is logically non-existent, the instance of a corresponding private activity service module context object is searched according to a user session ID, and the access request is transferred to the instance of the private activity service module context object for processing; if the public identifier of the service module object is logically true, the access request is transferred to the instance of the public activity service module context object for processing; the client-sided or other external accesses must provide the name of the activity service module group object to be accessed, the name of the activity service module object, the type of action requested to execute (such as data object of the service module, view description component object, and executing service module activities) and the requested member object name;

a private activity service module context object, wherein: the instance of the object is created when a user logs in successfully (generally cached in an HttpSession object), the object implements an authentication interface for all permissions owned by the logged-in user, and caches private information of the logged-in user or other information related to the logged-in user; according to the request, the instance of the private activity service module context object automatically creates, caches, manages and calls the instance of the activity service module group object, if the instance does not exist, the access authorization authentication is performed according to the service module object (with same name) corresponding to the name of the requested activity service module group, if the authentication is passed, an instance of an activity service module group object is created according to the service module object and is cached in the instance; and simultaneously, a client-sided or other external access request is transferred to the instance of the activity service module group object;

a public activity service module context object, wherein: when a service module control engine starts, an instance of a public activity service module context object is created for managing instances of all activity service module group objects whose public identifier is logically TRUE; when the request transmitted by the service module control engine is accepted, the instance of a corresponding activity service module group object is automatically searched, and the client-sided or other external access requests are transmitted to the instance of the activity service module group object whose processing manner is as same as the instance of the private activity service module context object, but no any authorization authentication is performed;

an activity service module group object which is created by the instance of the private activity service module context object or the instance of the public activity service module context object according to the client-sided or external request, for accepting the client-sided or other external requests transmitted by the instance of the corresponding private activity service module context object or the instance of the public activity service module context object, for decoding and parsing data from the client-sided or other external access requests to further processing, wherein: when the instance of the activity service module group object is created, the instance of the activity service module group object creates and caches an instance of an activity service module object according to the same named service module object, that is, the instance of the activity service module group object must have the instance of a same named activity service module object; according to a name of an activity service module of the client-sided or other external access requests, the instance of the activity service module group object searches the instance of the cached activity service module object, and continues to process the access request, for example, the instance of the previously parsed data drive the activity data object to which the instance of the activity service module object belongs for performing data synchronization and reception, and executing the service module activity with the specified name in the instance of the activity service module object separately or simultaneously according to the requested action type; according to the request type and the execution of the service module activity, the description text, data, exception information and other resources of the member object owned by the instance of the requested and active pushed activity service module object are returned, and then are outputted to the client-sided or other external access interfaces after performing unified format encoding (such as json, xml format text); and an activity service module object which is created and cached in the instance of the activity service module group object by the instance of the activity service module group object according to the service module object with a same name defined in the system, and is scheduled and managed by an instance of a corresponding activity service module group object, wherein: the instance of the activity service module object contains the instance of a service module object with the same name, and the member object owned by the instance of the activity service module object is from the member object defined and inherited in the corresponding service module object; the instance of the activity service module object creates and manages the activity data object based on the data object in the service module object, and uniformly encodes and outputs various returned resources, data or exception information which are needed to be requested for the client-sided or other external access according to the instance of the activity service module group object; the instance of the activity service module group object further creates and caches an instance of a new activity service module object according to a request for a view description component of another entity service module object linked in the service module object; the request of the client-side to the linked view description component is transferred to the instance of the new activity service module object, the working principle and processing mode of the instance of the new activity service module object are same as those of the instance of the above-mentioned activity service module object; at this time, the instance of the activity service module group object contains instances of multiple activity service module objects, instances of all activity service module objects have an independent running environment and space, but are all in the instance of a same activity service module group object, instances of different activity service module objects can call and communicate with each other through the instance of the corresponding activity service module group object;

the client-sided system architecture comprises:

a client-sided view factory configured to create various types of view components based on format data of various types of view description component objects returned by the server-side, namely, view component for display view on the client-side;

a client-sided control engine configured to process a request on the client-side, uniformly format data to be sent to the server-side, send the encoded format data or other non-format data to the server-side through network, and simultaneously or separately request the resource data and request to call service module activity, wherein: after completing the request, the data returned by the server-side are decoded and parsed; the view component is created and cached through the client-sided view factory based on the format data of the parsed view description member; according to the parsed data object formatted text, the instance of data proxy object on the client-side is created and cached; the formatted data of the data object are loaded to the instance of the data proxy object; simultaneously, a returned script on the server-side is generated, cached or executed and the view component display is driven; other returned resources are loaded according to specific types;

activity service module group proxy object which is corresponding to the server-sided system architecture, wherein: according to a name of a returned activity service module group from the client-sided request, the client-sided control engine creates and caches an instance of an activity service module group proxy object, and simultaneously creates an instance of a same named activity service module proxy object which is cached in the instance of the activity service module group proxy object; the instance of the activity service module proxy object caches and manages the instance of the client-sided member object which comprises instance of activity data proxy object, view component object and other type data; the instance of every client-sided activity service module group proxy object is corresponding to the instance of one activity service module group object cached in the server-side, and the instance of every activity service module proxy object cached in the instance of the client-sided activity service module group proxy object is corresponding to the instance of the activity service module object cached in the instance of the corresponding server-sided activity service module group object based on the name; since these members are at two ends and corresponding to each other one to one, "proxy" is added to the client-side for distinguishing from each other; generally speaking, the web software client-side often displays a view in a browser, each page has an independent running space, so that each page also has an independent client-sided control engine environment, the client-sided control engine generally only manages the instance of one activity service module group proxy object, the instance of the activity service module group proxy object managed by each page corresponds to an instance of an activity service module group object on the server-side; a corresponding mode of the instance of the activity service module group proxy object and the instance of the activity service module group object is established by name, unique identifier or combination of name and identifier, but the instance of the activity service module proxy object and the instance of the activity service module object respectively owned by the instance of the activity service module group proxy object and the instance of the activity service module group object are corresponding to each other by naming, and the member object of the instance of the activity service module proxy object and the member object of the instance of the activity service module object are corresponding to each other by naming;

an activity service module proxy object, wherein an instance of an activity service module proxy object is cached in the instance of the activity service module group proxy object and is corresponding to the instance of the activity service module object on the server-side by naming access; the activity module proxy object is configured to cache and manage the instance of the activity data proxy object, view component and other resource data on the client-side, and accessing by naming;

an activity data proxy object for implementing client-sided data persistence management, which serves as a data source displayed by the view component, corresponds to an instance of a same named activity data object in the activity service module object, and row data in the activity data proxy object comprises partial or all row data of instances of the activity data objects;

view component object which is various types of view components for displayed on the client-side, and is created by the client-sided view factory based on the formatted text of the view description component returned by the client-side, wherein: the view component object interacts with data of the instance of the activity data proxy object through event driven response mechanism, bidirectionally or unidirectionally response based on characteristics of the view component object; and other resources which are other data besides the instance of the activity data proxy object and the instance of the view component object in the instance of the activity service module proxy object, such as variables, scripts, and images.

Also, the present invention provides an operation method of the service model-oriented software system mentioned above, which comprises steps of:

(S1) starting a server-side of the software system, loading a server-sided service module control engine, creating an instance of a public activity service module context object, and completing an initial operation;

(S2) initializing a client-side, starting a client-sided control engine of a client-sided system architecture, performing an initialization based on an initial service module name, and turning to (S4);

(S3) the client-side performing related operations (such as performing submission operation after inputting data in an interactive view), proposing a request for the client-sided control engine according to needs, the client-sided control engine uniformly coding parameters and formatted data which are required to be sent a request to the server-side;

(S4) the client-sided control engine sending the request (such as view description component, data object or other resources, executing service module activity) for the server-side, sending data which are required to be sent to the server-side through Internet/Intranet, wherein: parameters of the request comprise activity service module group object name, activity service module object name, activity types, and activity names and other parameters of the request;

(S5) the server-side responding the client-sided or other external request, and transferring the request to the server-sided service module control engine, the server-sided service module control engine searching a service module object in a service module object factory according to a name of the activity service module group of the request; if the service module object does not exist, turning to (S18), namely, abnormally completing;

(S6) according to a public identification value of the searched service module object, if the public identification value is logically NOT, the service module control engine searching an instance of a corresponding private activity service module context object through a user session ID and transferring a request; if the public identification value is logically TRUE, transferring the request to an instance of a public activity service module context object for processing, and turning to (S10);

(S7) the instance of the private activity service module context object searching an instance of an activity service module group object according to a name of the requested activity module group; if the corresponding instance is existent, turning to (S14);

(S8) if the corresponding instance is not existent, the instance of the private activity service module context object performing authority authentication according to an access setting of the service module object; if the authority authentication is not passed, turning to (S16) (namely, returning exception information);

(S9) the instance of the private activity service module context object creating an instance of an activity service module group object according to a corresponding same named service module object, caching and turning to (S12);

(S10) the instance of the public activity service module context object searching an instance of an activity service module group object according to a name of the requested activity module group; if the corresponding instance is existent, turning to (S14);

(S11) the instance of the public activity service module context object creating an instance of an activity service module group object according to a corresponding service module object and caching;

(S12) when the instance of the activity service module group object is created, the instance of the activity service module group object simultaneously creating an instance of a same named activity service module object based on the corresponding service module object and caching in the instance of the activity service module group object;

(S13) the instance of the context object (the private activity service module context object or the public activity service module context object) where the instance of the activity service module group object belongs to initializing the instance of the activity service module group object (namely, initializing the service module activity); and after completing the initialization, transferring the client-sided or other external requests to the instance of the activity service module group object;

(S14) the instance of the activity service module group object further processing the client-sided or other external requests, searching an instance of an activity service module object to be called in the activity service module group object according to the name of the requested activity service module; and turning to (S16) if the instance is not existent (namely, returning exception information);

(S15) the instance of the activity service module group object receiving, decoding and parsing the transferred data, driving the instance of the activity data object to which the instance of the activity service module object belongs to perform data synchronization and reception; and according to the access request, executing separately or simultaneously the service module activity with the specified name in the instance of the service module object;

(S16) after the instance of the activity service module group object completing processing the client-sided or other external requests; according to the request type and the execution of the service module activity, uniformly formatted coding description text (such as j son, xml formatted text) formed by the member object owned by the instance of the requested and active pushed activity service module object, data in the instance of the activity data object, the exception information and other resources; and then outputting to the client-sided or other external access interfaces;

(S17) the client-sided control engine decoding and parsing according to the data returned by the server-side, driving the client-sided view factory to create a view component with a specified type according to the view description text, creating an instance of an activity data proxy object according to the data object description text, loading row data from the instance of the corresponding server-sided activity data object, caching into the instance of the activity service module proxy object of the instance of the client-sided activity service module group proxy object, generating, caching, or executing a returned script and loading other resources; after the data of the instance of the activity data proxy object are loaded, driving the data change event of the instance of the data proxy object to execute, the view component responding, and triggering a drawing method of the view component to draw the view; and (S18) completing an interaction, and then turning to (S3).

The service model-oriented software structure and the operation method thereof provided by the present invention have some advantages as follows.

(1) The service model-oriented software structure takes a service module object as a basic component thereof. A member object of the service module object comprises independent class files. The service module object is loosely coupled, opened and packaged due to the composition and inheritance rules of the member object, so that the shortcomings of the object-oriented model such as tight coupling and closure, so as to better support the flexible needs of Internet/Intranet software.

(2) Through taking the service module object as the basic component of the software system, the design of the software system is completely divided according to the characteristics and content of the business requirements, so that the software development is more focused on the business requirements content itself, and clear in hierarchy, which reduces the dependence on technology and simplifies software system design.

(3) Each service module object has an independent class loader (such as ClassLoader) that can be loaded and released independently. Service module activities (which are all independent class files, such as Java class files) of the service module object, are only managed by the corresponding service module class loader (i.e., the service module object that defines the service module activities); the server service module control engine is used to performed scheduling, when service module object properties or member objects are changed to be reloaded, just make the service module object factory discard the service module object that has been created and recreate one (new service module object needs recreating a new ClassLoader), so that all calls to the named service module object point to the new service module object. This unique loading and release method provides the technical support and implementation for the real-time partial update software components of the running software system, avoiding stopping the system operation to update software functions or bugs, thereby reducing software usage costs (most often, stop running software to update functions or bugs is even a disaster).

(4) The server-sided service module object factory further provides a real-time class compiler for providing class compiling services, when the corresponding service activity is called, if the called service module activity is a source code file, the compiler compiles in real time and returns the compiled class object. This approach, combined with the third advantage mentioned above, provides a real-time development, running, and test environment for software developers. By modifying, adding, and submitting new functional modules, only the resource definition within the specified service module (including service module attributes, member objects and service activity configuration) is submitted and covered, without stopping the software system running or restarting the software operation, also without redeploying, compiling and releasing, thereby greatly improving the development efficiency of the software system; and especially the research and development team members can call share software development, runtime and test environments in real time at any location without interfering with each other, which is difficult to be achieved through traditional models.

(5) The service-oriented model is a service-oriented software architecture that supports AOP (Aspect Oriented Programming) programming and complies with the development trend of Internet/Intranet software development and software operation platform. Since the control engine is provided on both the client side and the server side to load, cache, schedule, and unload the componentized lifecycle management scheme based on the instance of the activity service module group object and the instance of the activity service module object and their instances of corresponding proxy objects, the repeated transmission and loading of components on the client side and server side are effectively avoided, so as to greatly reduce the network interaction traffic between the client side and the server side. For the member object—"service module activity" not only provides a rich lifecycle management mechanism, but also for the service module activity object that needs to repeatedly create a new instance, the instance clone method can be used to creates a new instance, further improving the system performance (cloning performance is far superior to the reflection used by traditional technologies); the use of other member objects to which the service module object belongs is only transferred and loaded according to the request when needed; after that, only the changed content and data are interactive. The support of these methods and technologies greatly reduces the network interaction traffic and CPU usage, so that the software system provided by the present invention has high performance characteristics.

(6) The present invention provides a total solution for the PaaS software architecture platform, which supports component development, integration, and customization. By specifying the mode of the name of the parent service module, multi-level direct inheritance is realized, and by "link abstract service module mode", multiple inheritance are realized; the characteristics of direct inheritance can make the system hierarchy clear and greatly improve the reuse ratio of the program; the advantages of multiple inheritance can also package functionally independent service functions, further enriching the component development and reference of the service layer functions; the software system based on the activity service module group object, the activity service module object and its corresponding proxy object is similar to the cellular architecture, so that the communication and positioning between the client side and the server side are very convenient, the programmer only needs to consider the acquisition and call of the member objects in the module, and does not need to consider where the other party is located (just like quantum entanglement, no need to consider where another is), everything is automatically scheduled by the client-sided and server-sided control engine. This structural feature, even if a large number of activity service module object components are aggregated in a function page, will not cause the conflict of component naming and running, so that a very complex client view is easily managed and formed, so as to easily develop the software system with complex view.

(7) The overall solution of the present invention provides an integrated solution for the view, data persistence, data processing, data interaction, data type automatic conversion, multi-level security protection and audit mechanism, and independent right management mechanism (which can be independent from software scripts, that is, the program code does not need to consider access authorization), so as to enhance the performance, security, stability, reliability, and view interaction friendliness of the system.

(8) The code quantity of the developed software system provided by the present invention is greatly reduced compared with the traditional method, has clear hierarchy, clear structure, simple development and simple configuration, is easy to be learned, has high development efficiency, low implementation and maintenance cost, is easy to be expanded, has wide range of applications, so as to lay a solid foundation for the development of service-oriented software technology, and also open up a new idea and an implementation method for the development and application of networked software.

BRIEF DESCRIPTION OF THE DRAWINGS

FIG. 7 is an example of the contents of a portion of the files in FIG. 4.

FIG. 7A is an enlarged view of a portion at one side of a dashed line in FIG. 7.

FIG. 7B is an enlarged view of another portion at another side of the dashed line in FIG. 7.

DETAILED DESCRIPTION OF THE PREFERRED EMBODIMENT

The present invention discloses a software operation method, which utilizes an object-oriented technology and provides a cellular software system through taking a service module object as a basic unit. The software system is designed based on characteristics and contents of business requirements; the loose coupling exists between a client-side and a server-side, between service module objects, between member objects of the service module objects; the software system supports componentized development and focuses on the reuse of components and codes. In addition, when the software system is running, its running space is divided through a public activity service module context object (or a private activity service module context object), an activity service module group object and an activity service module object; combining with a corresponding proxy object and a named access method, an amount of codes required by resource calls and executive requests is uniformly and greatly simplified, so as to avoid name conflict, simplify deployment and clarify hierarchy. The service module object and its member object, the generated activity service module object and the instance of the member object to which the generated activity service module object belongs are created automatically based on the request. Programmers generally do not need to actively create instances. For the service module activity object of the service module object, all construction methods with parameters are canceled to further simplify the creation process of the service module activity object, and complex parameters set by traditional software systems for automatically creating instances are canceled; the assignment of instances can be obtained by an object cloning method, added with the rich service activity lifecycle configuration to greatly improve the system performance.

Figure 1:
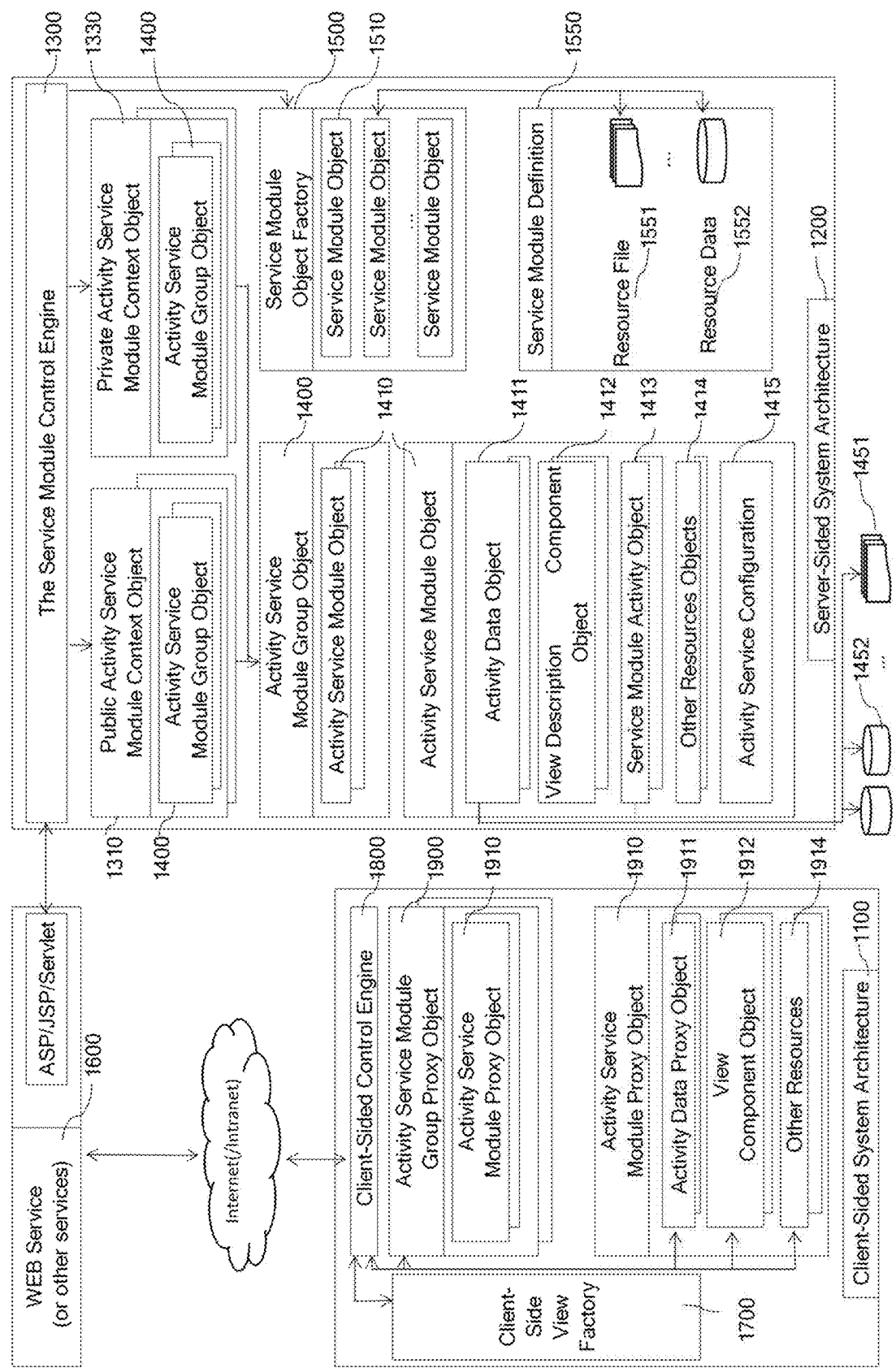
FIG. 1 is an overall architecture of a service module-oriented software system provided by the present invention.

The present invention discloses a service model-oriented software system which takes the service module object as a basic unit to run software. FIG. 1 shows an overall architecture of the service model-oriented software system, which comprises a server-sided system architecture 1200 and a client-sided system architecture 1100, wherein: the server-sided system architecture 1200 comprises a service module object factory 1500, a service module control engine 1300, a public activity service module context object 1310, a private activity service module context object 1330, an activity service module group object 1400 and an activity service module object 1410; the client-sided system architecture 1100 comprises a client-sided view factory 1700, a client-sided control engine 1800, an activity service module group proxy object 1900 and an activity service module proxy object 1910; the activity service module proxy object 1910 comprises an activity data proxy object 1911, a view component object 1912 and other resources 1914; a WEB service 1600 (or other services) responds to a client-sided request or other external access requests, and transfers the client-sided request or other external access requests to ASP (Active Server Page)/JSP (Java Server Page)/Servlet running in a WEB server, and then the ASP/JSP/Servlet transfers the client-sided request or other external access requests to the service module control engine 1300, here, the ASP is a Microsoft Web service application, the JSP and Servlet are a dynamic web page technology standard and access technology and belong to J2EE specification; Java is also a programming language dominated by the Servlet, J2EE and Java are currently owned by Oracle Corporation, JavaScript is a scripting language that belongs to a network which was originally designed by Netscape Company. In order to make this embodiment more understandable, some nouns or technical implementation methods of Java and J2EE are referenced and combined in the document of the present invention.

Functions of all components of the software system are described as follows.

The service module object factory 1500 is configured to search a service module definition 1550 in the software system based on a name of service module; and then according to a searched resource file 1551 or resource datum 1552 of the service module definition 1550, to create and manage a service module object 1510; when the client-side or external access requesting an instance of a service module object, it is firstly searched in a cache, if it does not exist in the cache, it is created according to the service module definition, and then is cached for a next call.

The service module control engine 1300 is configured to receive the client-sided request or other external access requests, provide session security authentication service, and uniformly manage (including query, create, cache, call, and release) an instance of a private activity service module context object 1330 and an instance of a public activity service module context object 1310. According to a name of an activity service module group object of the access request, an instance of the service module object 1510 is searched in the service module object factory 1500; if a public identifier of the service module object 1510 is logically NOT, an instance of a corresponding private activity service module context object 1330 is searched according to a user session ID, and then the client-sided request or other external access request is transferred to the instance of the private activity service module context object for processing; if the public identifier of the service module object 1510 is logically TRUE, the client-sided request or other external access request is transferred to the instance of the public activity service module context object 1310 for processing. The client-sided request or other external access requests must provide the name of the activity service module group object to be visited and the name of the activity service module object to be visited, a type of action requested to be executed (such as a data object for obtaining a service module, a view description component object and execution of service module activities) and a name of a requested member object. These parameters are the basis for the service module control engine 1300 to perform access positioning according to the client-sided request or other external access request. The private activity service module context object 1330 is described as follows. An instance of the private activity service module context object is created when a user logs in successfully which is generally cached in an HttpSession object. The private activity service module context object 1330 achieves an authentication interface of all permissions owned by the logged-in user, and caches private information of the logged-in user or other information related to the logged-in user. According to a request, the instance of the private activity service module context object 1330 automatically creates, caches, manages and calls an instance of the activity service module group object 1400; while processing a request transferred from the service module control engine, the instance of the corresponding activity service module group object is automatically searched, if the instance of the activity service module group object does not exist, the access authorization authentication is performed according to the service module object 1510 corresponding to (with a same name) a name of the requested activity service module group, if the access authorization authentication passes, the instance of the activity service module group object 1400 is created according to the service module object 1510 and is cached in the instance of the private activity service module context object; and simultaneously, the client-sided request or other external access requests are transferred to the instance of the activity service module group object 1400.

The public activity service module context object 1310 is described as follows. When the service module control engine 1300 starts, an instance of the public activity service module context object 1310 is created for managing the instances of all activity service module group objects 1400 whose public identifiers are logically TRUE, and the public identifiers of the instances of all activity service module objects managed by the instances of the activity service module group objects whose public identifiers are logically TRUE are also logically TRUE; when the request transferred by the service module control engine 1300 is accepted, an instance of a corresponding activity service module group object 1400 is automatically searched, and the request is transferred to the instance of the activity service module group object 1400 for processing, which is as same as a processing manner of the instance of the private activity service module context object.

The activity service module group object 1400 is created by the instance of the private activity service module context object 1330 or the instance of the public activity service module context object 1310 according to the client-sided request or other external requests, is adapted for accepting the client-sided request or other external requests transferred by the instance of the corresponding private activity service module context object 1330 or the instance of the public activity service module context object 1310, and then decoding and parsing data from the client-sided request or other external requests to further processing. When the instance of the activity service module group object 1400 is created, the instance of the activity service module group object 1400 creates and caches an instance of the activity service module object 1410 according to the same named service module object 1510, that is, the instance of the activity service module group object 1400 must have an instance of a same named activity service module object 1410. According to the name of the activity service module of the client-sided request or other external access requests, the instance of the activity service module group object 1400 searches the instance of the cached activity service module object 1410, and continues to process an access request; for example, according to the corresponding naming method, the data modified by the client-sided data proxy object drives an instance of an activity data object 1411 to which the instance of the activity service module object 1410 belongs to perform data synchronization and reception, and simultaneously, a service module activity with a specified name in the instance of the activity service module object 1410 is executed separately or simultaneously according to a type of action of a request. While executing the service module activity, if the request is from the instance of the private activity service module context object 1330, authorization certification is performed on the instance of the private activity service module context object 1330 by the instance of the activity service module group object 1400 according to an access authorization name of the service module activity object 1513, if the authorization certification passes, the service module activity is executed. After completing above affairs, according to a request type and an execution of the instance of the service module activity object, the instance of the activity service module object returns a description text (such as json, xml formatted text), data, exception information and other resources of member objects owned by the instance of the requested and active pushed activity service module object 1410, and then these resources are outputted to a client-sided or other external access interfaces after being uniformly formatted coded. It should be noted that in the present invention, there is no strict distinction between data and resources; generally speaking, resources are more extensive; for example, scripts, view description component files and other files can be called as resources, but these resources also exist in the software system in various forms; in addition, in the present invention, there is no obvious difference between the object and the instance description; in the software operation, all created and managed objects exist in an instance manner, for example, the activity service module object managed by the activity service module group object is actually the instance of the activity service module object managed by the instance of the activity service module group object, or the service module object is corresponding to the instance of the service module object, other descriptions are also the same. The instance of the activity service module group object 1400 is the basis for maintaining component lifecycle management of the client-side or server-side; a corresponding relationship between the instance of the client-sided activity service module group object proxy 1900 and the instance of the server-sided activity service module group object 1400 is automatically managed and identified by the control engines respectively on the client-side and the server-side; this corresponding relationship is transparent to programmers and do not need to concern about where the corresponding other party is; this corresponding relationship established by proxy mode can achieve manipulating local data, resources or instruction calls just like manipulating data or instructions of the other party, thereby greatly simplifying the system control, data synchronization and resource positioning operation.

The activity service module object 1410 is created by the instance of the activity service module group object 1400 according to the same named service module object 1510 defined in the software system and cached in the instance of the activity service module group object 1400, and is called and managed by the instance of the corresponding activity service module group object 1400. The instance of the activity service module object 1410 contains an instance of a same named service module object 1510, and the member object owned by the instance of the activity service module object 1410 is from the definition of the member object owned by the corresponding service module object 1510. The instance of the activity service module object 1410 creates and manages the instance of the data object 1411 based on the data object in the service module object 1510, and uniformly codes and outputs various returned resources, data or exception information which are needed to be requested for the client-sided request or other external access requests through the instance of the activity service module group object 1400 according to the execution of the instance of the service module activity object 1413. Data interaction is performed between the instance of the activity data object 1411 and a database 1452 or other external resources 1451, which can be in the service module activity and controlled by script codes), so as to achieve data persistence, data access, data processing and data updating. Also, the instance of the activity service module group object 1400 further creates and caches an instance of a new activity service module object 1410 according to a request for the member object (the view description component) of other linked entity service module objects 1510 in the service module object 1510. At this time, the request of the client-side to the linked member object is transferred to the instance of the new activity service module object 1410, the working principle and processing mode of the instance of the new activity service module object 1410 are same as those of the instance of the above-mentioned activity service module object 1410; and at this time, the instance of the activity service module group object 1400 contains multiple instances of the activity service module object 1410, all instances of the activity service module object 1410 have an independent running environment and space, but are all in the instance of a same activity service module group object 1400, the instances of different activity service module objects can be called and communicated with each other through the instances of the corresponding activity service module group objects 1400.

The client-sided view factory 1700 is described as follows. Various types of view component objects 1912, namely, view components, are created based on various types of view description component formatted data returned by the client-side, for the client-sided view display. The client-sided view factory 1700 can create the instances of a wide variety of view component objects 1912; the types of the view component object 1912 are defined according to specific characteristics of the view components (such as dialog view 4323, container view 4322, button view 4321 and free view 4524 types of view definition contents.

The client-sided control engine 1800 is configured to process the client-sided request, uniformly formatted codes the data to be sent to the client-side, sends coded formatted data or other unformatted data to the server-side through network, and simultaneously or separately requests various resource data and requests to call the service module activity; after completing the request, the data returned by the server-side are decoded and parsed; the parsed data are respectively processed according to different types; according to the name of the returned activity service module object, the instance of the activity service module proxy object 1910 is created and cached in the instance of the corresponding activity service module group proxy object 1900; according to the formatted data of the view description component, the instances of various types of view component 1912 are created through the server-sided view factory 1700, and cached in the instance of the corresponding activity service module proxy object 1910; according to the data project formatted text, the instance of the client-sided data proxy object 1911 is created and cached in the instance of the corresponding activity service module proxy object 1910; the returned formatted data of the data object are loaded to the instance of the corresponding data proxy object 1911; and simultaneously, a script returned by the server-side is generated, cached or executed and the view component 1912 is driven to display; or other resources 1914 are loaded.

The activity service module group proxy object 1900 is corresponding to the server-sided system architecture 1200, and is created and managed by the client-sided control engine 1800. When the instance of the activity service module group proxy object 1900 is created, the instance of a same named activity service module proxy object 1910 is also created and cached in the corresponding activity service module group proxy object 1900. The instance of the activity service module group proxy object 1900 manages one or more instances of the activity service module proxy object 1910. Generally speaking, Web software client-sided display the view through browser, every page has an independent running space, so that every page has an independent client-sided control engine 1800 which generally manages the instance of one activity service module group proxy object 1900, the instance of the managed activity service module group proxy object 1900 on every page is corresponding to the instance of one server-sided activity service module group object 1400. One-to-one correspondence between the instance of the activity service module group object 1400 and the instance of the activity service module group proxy object 1900 through naming, unique identification code or combination of naming and identification code, but their respectively owned instance of the activity service module object 1410 and the instance of the activity service module proxy object 1910 are in one-to-one correspondence to each other one-to-one through naming; the member object of the instance of the activity service module object 1410 is also in one-to-one correspondence to the member object of the instance of the activity service module proxy object 1910 by naming.

The activity service module proxy object 1910 is cached in the instance of the activity service module group proxy object 1900 and is in one-to-one correspondence to the instance of the server-sided activity service module object 1410 by naming access according to the space where the instance of the activity service module group object 1400 and the instance of the activity service module group proxy object 1900 are through naming. The activity service module proxy object 1910 caches and manages the instance of the client-sided activity data proxy object 1911, the view component 1912 and other resources 1914.

The activity data proxy object 1911 is configured to achieve client-sided data persistence and processing, acts as the displayed data source of the instance of the view component object 1912, is corresponding to the instance of the same named activity data object 1411 in the instance of the above-mentioned activity service module object 1410, row data of the activity data proxy object comprise partial or all row data of the instance of the activity data object 1411. Preferably, row data of the instance of the activity data proxy object 1911 are corresponding to row data of the instance of the corresponding server-sided activity data object 1411 through a dynamically generated unique row identifier to act as a row corresponding basis of data synchronization. The column synchronization of the row data comprises two manners: column name-based synchronization in which every row of data use column names and corresponding values to interact and synchronize data, and sequence-based synchronization in which every row of data use letters added with column numbers and corresponding values to interact and synchronize data.

Figure 4:
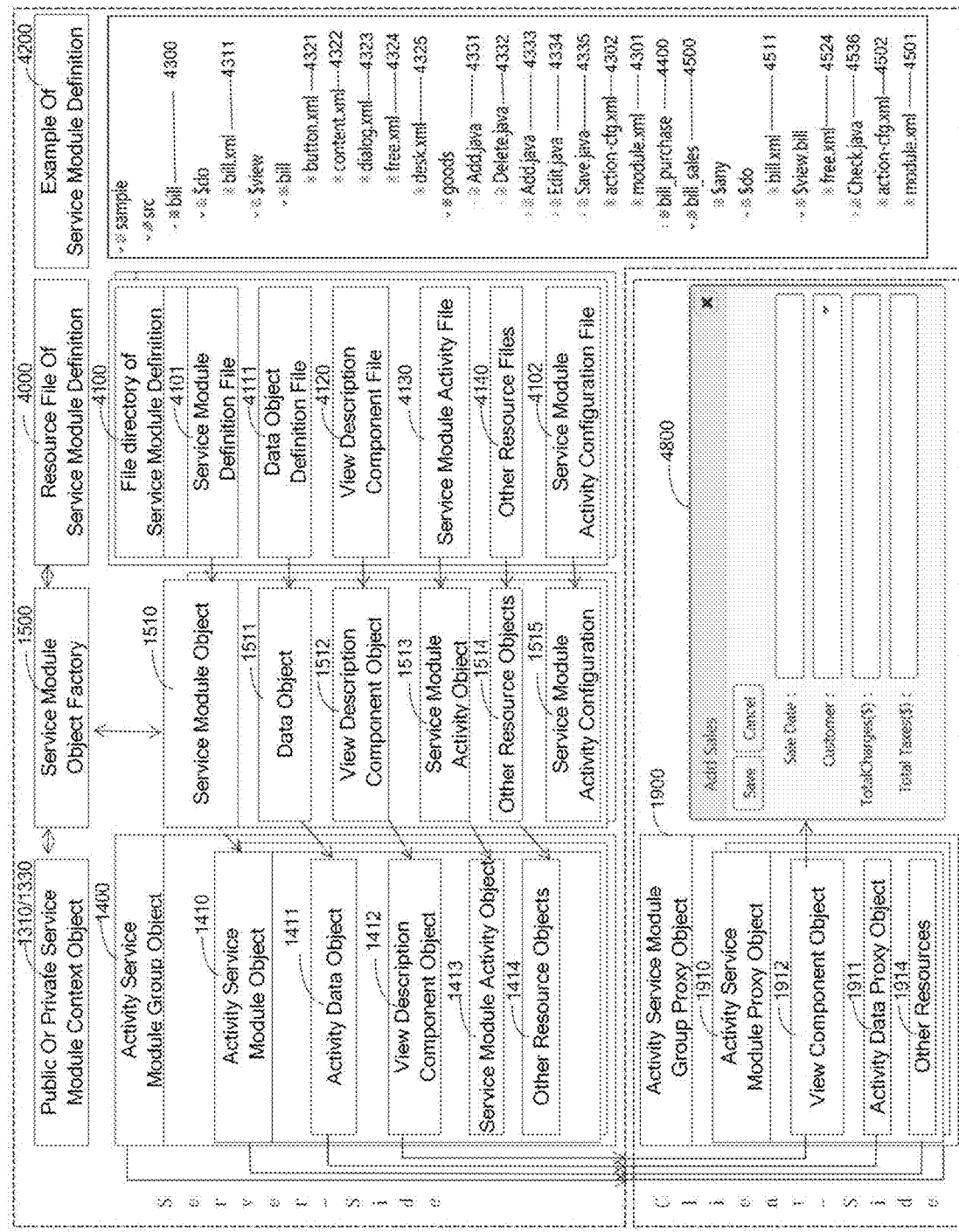
FIG. 4 shows the object evolution during running software.

The view component object 1912 is a view component with various types displayed on client-side, and is created by the client-sided view factory 1700 based on the formatted text of the view description component returned by the server-side. The view component object 1912 can interact with the instance of the data of the instance of the activity data proxy object 1911 through an event driven response mechanism, and can bidirectionally or unidirectionally data transfer response based on characteristics of the view description component. The unidirectional transfer is in general that according to the data change of the data object, the view component dynamically generates the view; the bidirectional transfer means that any party's data changes will notify the other party of the changed data and make simultaneous changes, as shown in FIG. 4 4800; when the input item Customer changes, an inputted value is transferred to the data proxy object bill through value change event, a corresponding value in bill is synchronously changed.

Figure 2:
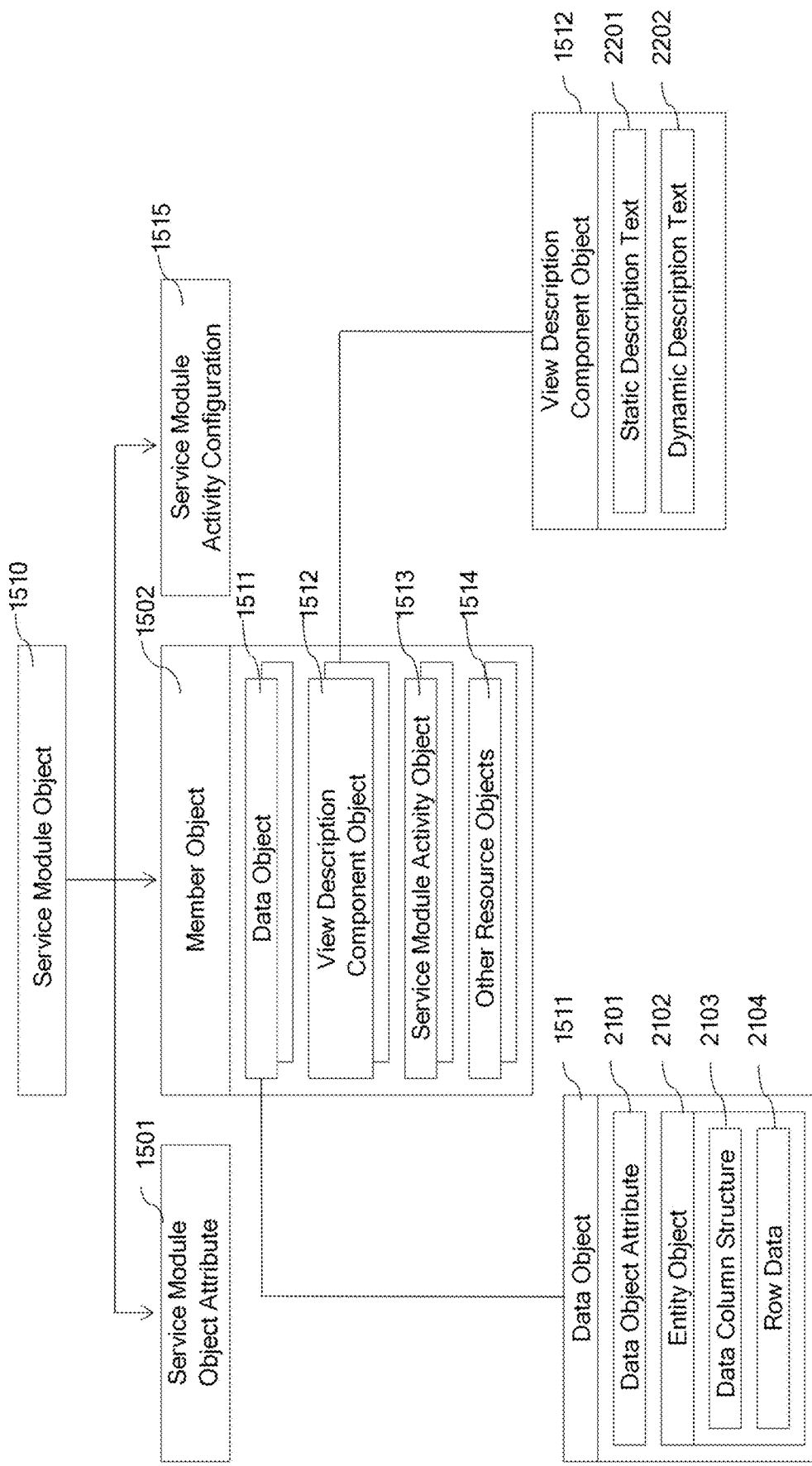
FIG. 2 is a schematic view of service module definition.

Other resources 1914 are other data besides the instance of the activity data proxy object 1911 and the view component object 1912 in the instance of the activity service module proxy object 1910, such as variables, scripts, images and other type data. The present invention discloses an organization structure of the service module object, as shown in FIG. 2, which comprises service module object attribute 1501, member object 1502 and service module activity configuration 1515, wherein: the member object 1502 comprises a data object 1511, a view description component object 1512, a service module activity object 1513 and other resource objects 1514. The service module object attribute 1501 comprises name of service module, name of initial view component, public identifier, activation identifier, life cycle identifier, access verification identifier, authorized alias, abstract service model identifier and name of parent service model. The name of service module is globally unique and is also a symbol for the software system to search a specified service model on a client-side and a server-side; the name of initial view component is a name of a view component object to be presented at the client-side while initially visiting the client-side and loading the view component. When the public identifier is logically TRUE, the service module is a public service module, and otherwise is a private service module; all accesses to the public service module do not need any authorization, which is suitable for web portals. When the public identifier is logically NOT, the service module is a private service module; all accesses to the private service module need user session security authentication and service module access authorization authentication, which is generally suitable for a software system which can be used through register and log. The activation identifier means whether the service module object is effective; when the activation identifier is logically TRUE, the service module object is effective and the service module can be normally used; and otherwise, any resources of the service module are not allowed to visit or call. The life cycle identifier is only effective when the service module is the public service module, and has two values comprising "maintaining" and "randomness"; when the value is "maintaining", if the external request visits the instance of the activity service module group object 1400, the instance of the public activity service module context object 1310 assigns an instance of the activity service module group object 1400 for this session, and maintains that this instance of the activity service module group object 1400 communicates and interacts with the instance of the client-sided activity service module group proxy object 1900; when the value is "randomness", the instance of the public activity service module context object 1310 randomly assigns an instance of a same named activity service module group object 1400 for every access of the instance of the client-sided activity service module group proxy object 1900, so as to provide services; once this session is completed, the instance of the activity service module group object 1400 is recycled and cached; the assignment is randomly again at a next access. When the access verification identifier is logically TRUE, the service module object can accept the client-sided request and other external requests, and otherwise, the client-sided request and other external requests are prohibited. The authorization alias is configured to allow the instance of the private activity service module context object 1310 to automatically judge whether the log-in user has permission to visit the service module object 1510 and automatically process according to the authorization alias. When the abstract service module identifier is logically TRUE, the service module object 1510 is an abstract service module object, and otherwise, is an entity service module object; the abstract service module object cannot independently provide the access service, and cannot create the instance of the activity service module group object 1400 or instance of the activity service module object 1410 according to the abstract service module. The name of parent service module represents a name of a service module object to be inherited of the service module object 1510. In the inheritance relationship established through the view component object in the linked abstract service module object, the linked abstract service module is regarded as the parent service module, the inheritance and coverage method of the member object are same, but the inherited member object of the sub service module object is only limited to the linked component itself and its related member objects.

The data object 1511 is an abstraction of the service entity object and accessible through a denomination. The data object 1511 comprises data object attribute 2101 and entity object 2102, wherein the data object attribute 2101 comprises data object name, whether being static, modified attribute, SQL (structured query language), inquiry text, synchronized column name, protect column name, update dependencies and number of page rows, wherein the data column may be user-defined. 'Whether being static' means that all callers of the instance of the activity data object 1411 share the instance of one entity object 2102; when 'Whether being static' is logically TRUE, the instance of the created activity data object 1411 based on the data object 1511 shares the instance of an entity object 2102. The modified attribute represents the modified data table name and unique key name (the unique key name can be one or combination of multiple data columns). SQL query text is a SQL statement that queries data from a database. The sync column name is the data column that specifies the sync to the client-side. Setting the synchronization column name means that the instance of the software client-sided activity data proxy object 1911 and the instance of the corresponding server-sided activity data object 1411 instance may have different data structures. Protecting column name means that the client-sided data column can be searched and cannot be modified. The update dependencies are the dependencies of instances of data objects and the dependencies of data column values when instances of multiple data objects submit the specified data table in the database to update data. The number of page rows is the maximum number of data rows per page when requesting data synchronization to the client-sided or other external access. The client-side can specify the page number to be obtained, and the server-side automatically pushes the row data within the specified page range according to the page number. The customized data column is a data column that the programmer can set the data object by itself; the entity object of the data object is a two-dimensional structural data table, including the data column structure 2103 and the row data 2104; the data column structure 2103 is the attribute description for each data column, comprising data column name, data type, data precision and default value; row data generally correspond to a data table in the database or a result set through SQL query, and are a middle portion for achieving data persistence, data processing, data access and data update; its detailed processing is not in this patent document, here is a brief description of the settings related to the software architecture.

The view description component object 1512 defines the view component object 1912 in the client-sided system architecture of the software system and comprises static description text 2201 and dynamic description text 2202. Optional, for the client-sided request, according to the static description text 2201 of the view description component object in the service module object 1510, the instance of the sever-sided activity service module object 1410 adds the positioning information and dynamically replaced attributes of the instance of the corresponding activity service module to form the dynamic description text 2202, and then generate a total description text to return to the server-side, and then is parsed by the client-sided control engine 1800, the instance of the client-sided view component object 1912 is created by the client-sided view factory 1700. The view component object 1912 adopts the component technology which has some types such as free tables, two-dimensional tables, tree tables, button groups, dialog boxes, component containers, binary containers, tabs, menus, list components, custom and linked components, and can be expanded as required. The view description component object 1412 has some different types and is corresponding to the instance of the view component object 1912 one to one. Preferably, this embodiment further provides a view component, namely, "button-group" view component (which is a view component including one or more buttons), different button combinations can be displayed through defining multiple operational manners. Simultaneously, according to the authorization alias of every button, the button which can be used when the login user has permission is only pushed, the button having no permission is not pushed to the client-side again, which simplifies the complex authorization management and program codes for generating views in the traditional way. The service module activity object 1513 generally exists as an independent object, is also an action or demand to drive the software system which takes the service module object 1510 as the basic unit for external and internal accesses. According to characteristics of accesses, the service module activity object 1513 needs an interface method for achieving the external and internal accesses. The service module activity object 1513 cancels all construction methods with parameters, cancels setting complex construction parameters for creating the instance of the traditional software system. The instance of the service module activity object is automatically created and managed by the system according to the request (of course, it does not exclude activity creation), which abandoning the complex parameter configuration of traditional software architecture and simultaneously improving the system performance.

Figure 5:
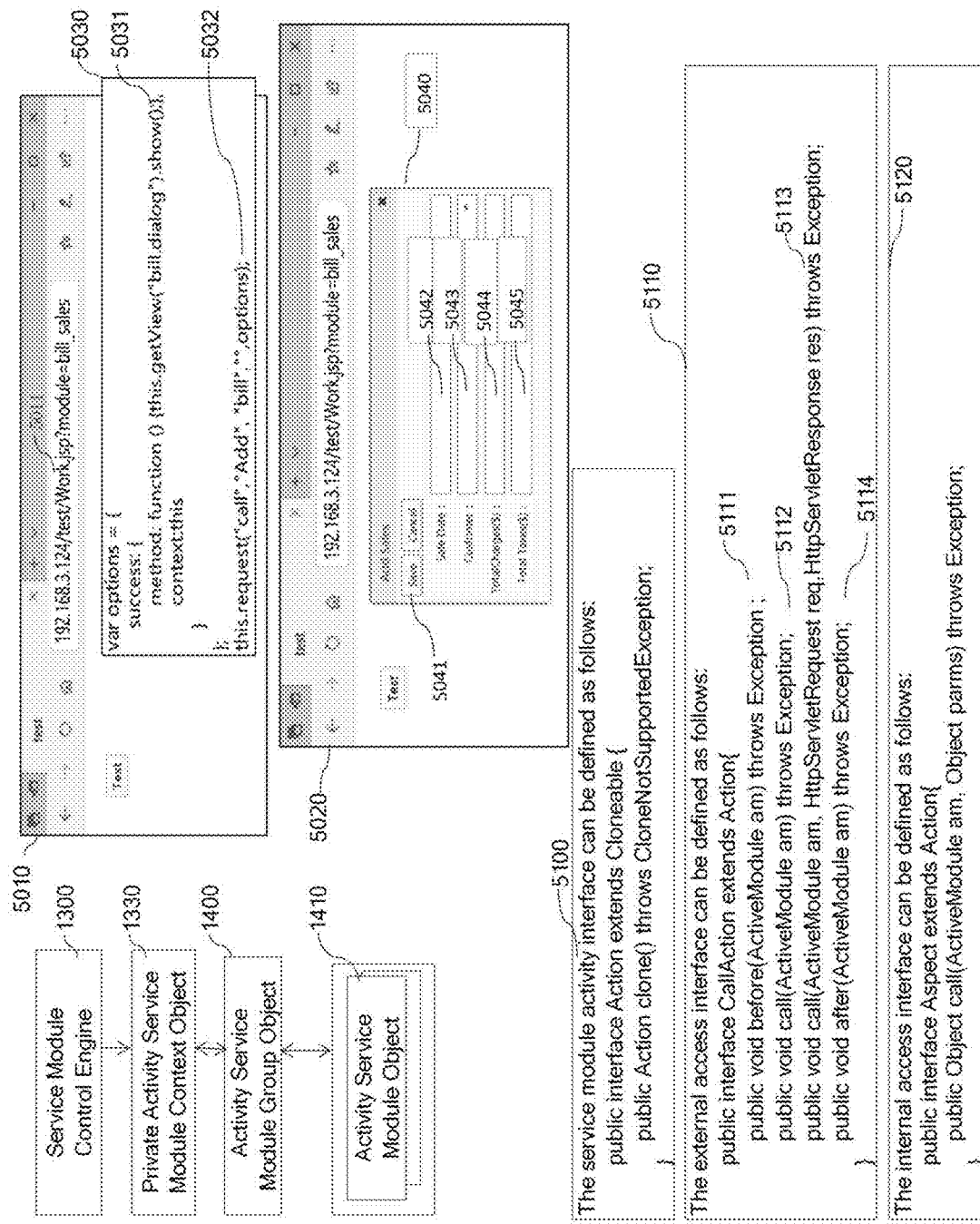
FIG. 5 shows running examples and access interfaces.

The software system of the present invention supports a face-oriented technology, and different aspects correspond to different named service module activities. These service module activity objects need to implement an internal access interface, as shown in FIG. 5, wherein the call of the server-sided system architecture 1200 for the faces in different application scenario includes but is not limited to the following types:

The OnInit activity is executed when the instance of the activity service module group object 1400 is initialized; while completing creating the instance of the activity service module object 1410, the OnLoad activity is executed; the OnRelease activity is executed when the instance of the activity service module object 1410 is released; the OnStartCall activity is executed before the instance of the activity service module object 1410 executes an external call; after the instance of the activity service module object 1410 executes the external call, the OnFinalCall activity is executed (even if an exception occurs during the call, the activity is also executed); when an exception occurs during execution of the external call, the OnException activity is executed; in addition, the external access interface implements three methods, namely, before, call and after, wherein the before happens before the call and the after happens after the call. The service module activity configuration 1515 defines the lifecycle type and access rights of the service module activity object 1513 (including self-defined and inherited) owned by the service module object 1510. The lifecycle type comprises four types, namely, temporary, session, module and sharing.

(1) Temporary represents that one instance of the service module activity object is assigned for every call of a specified named service activity object, and after completing the call, the instance is automatically discharged and released. When the lifecycle type of the service module activity object 1513 is not configured, this method is a defaulted choice.

(2) Session exists in the entire session period between the client-side and the server-side; the calls of the current session user in the instance of the same activity service module object 1410 to the specified named service module activity object 1513 point to a same instance; for example, the instance of the corresponding activity module object 1410 is released, the instance of the service module activity object 1413 is also released.

(3) Module means that in spite of inherited or self-defined, as long as a certain service module activity object 1513 is set in the current service module object 1510 to use this type, while creating the instance of the activity service module 1410 through the current service module object, all calls for the service module activity object 1413 point to a same instance.

(4) Share means that when all users create the instance of the activity service module 1410 based on any service module object, all calls for the specified named service module activity object 1413 point to a same instance, which is equal to the modification of static to the member object, allows the software system to implement a loosely coupled software structure that avoids direct dependencies between class loaders and between different service modules.

Other resource objects 1514 are other resource files and data in the service module object 1510 except the data object 1511, the view description component object 1512, and the service module activity object 1513, such as client-sided scripts, pictures and other type data, and are accessible through naming.

The naming of the member objects of the service module object 1511 is subtyped, such as the data object abc and the view component object abc, which does not cause naming conflicts.

Figure 3:
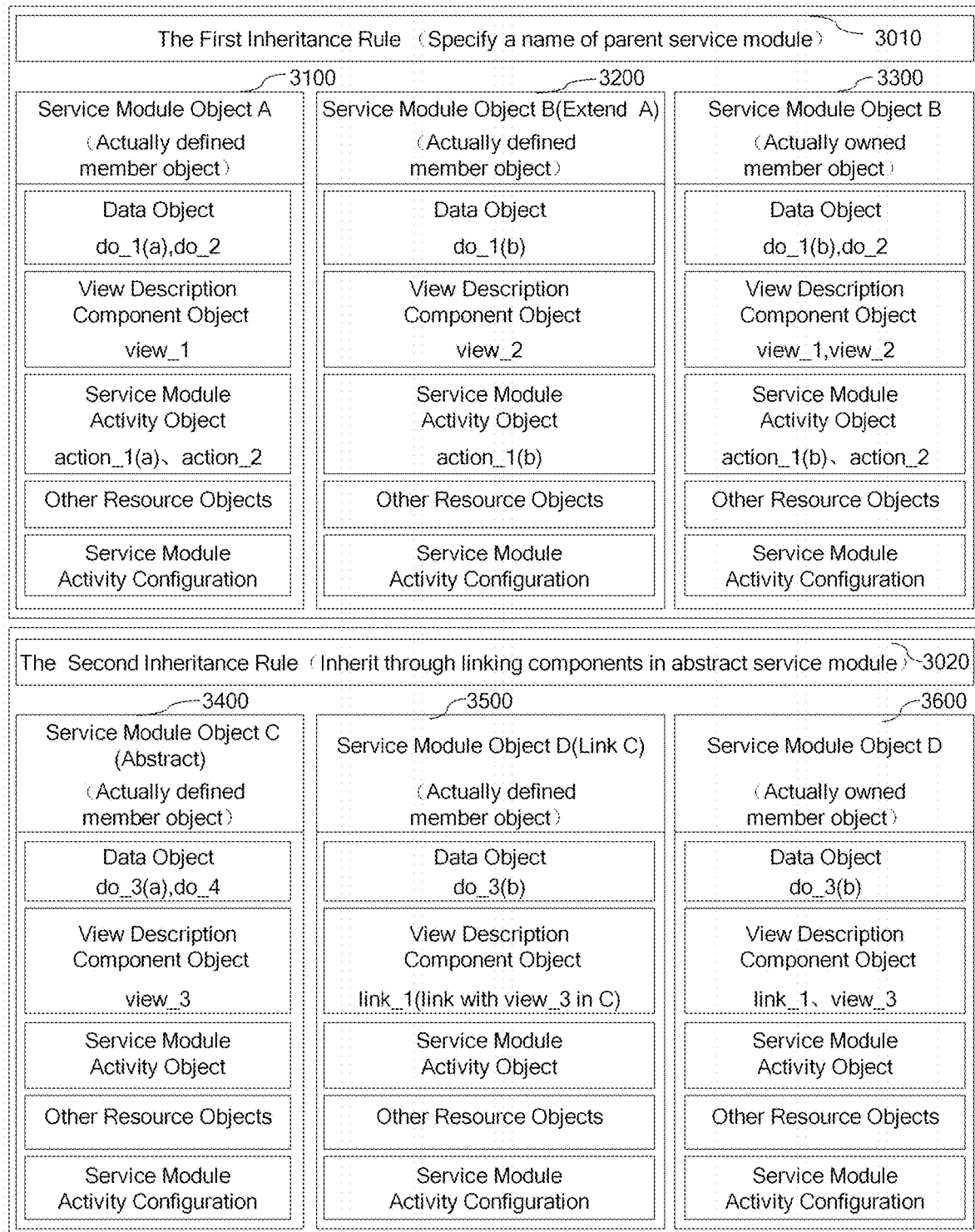
FIG. 3 shows the inheritance rule of service module.

The present invention discloses an inheritance rule, as shown in FIG. 3. The inheritance rule 3010 uses a manner of specifying the name of parent service module to achieve the inheritance of the service module object, which is called as direct inheritance rule; the sub service module object can inherit all member objects owned by the parent service module object (including its own definition and inheritance); when the sub service module object has a member object with a same type and name with the parent service module object, the member object of the parent service module object is covered, as shown in FIG. 3.

The service module object B 3200 inherits the service module object A 3100 to obtain the service module object B 3300. The service module object A 3100 defines the data object do_1 and do_2, the service module object B 3200 defines do_1, so that the service module object B 3300 owns the do_1 and do_2, wherein the do_1 is defined by the service module object B 3200 itself, the do_1 of the service module object A 3100 is covered; which is as same as the inheritance and covering method of other member objects. In addition, the covering method of the service module activity configuration is similar to this. In spite that the service module object B 3200 does not define action_2, since the service module object A 3100 is inherited, the access and lifecycle properties of action_2 can be set. Even if the access and lifecycle properties of action_2 are set in the service module object A 3100, these properties are covered by those of the service module object B 3200. If the service module object B 3200 does not set these properties, the properties set in the service module object A 3100 are adopted.

Preferably, the inheritance of the service module object 1510 also adopts the manner of linking the view description component object in the abstract service module object to achieve another inheritance rule, which is called to be indirect inheritance rule, as shown in FIG. 3.

The service module object D 3500 (entity service module object) defines a linked-type view component object link_1 to point to the view component view_3 in the abstract service module object C 3400 for obtaining a service module object D 3600, wherein the view description component object view_3 adopts the data object do_3. In the service module object D 3600, the call for the view component object link_1 points to view_3, so the service module object D 3600 actually owns the view component objects link_1 and view_3. Since view_3 and its related components have no recitation to the data object do_4, the data object do_4 is not inherited to the service module object D 3600. Since the service module object D 3500 defines do_3, the call of view_3 for do_3 is actually defined in the service module object D 3500, that is, do_3 in the abstract service module object C 3400 is covered. In the service module object D 3600, only after link_1 is called, view_3 actually exists in the service module object D 3600, and otherwise, the access is unable to be executed. If view_3 directly recites do_4 or other views related with view_3 recite do_4, while calling, do_4 is inherited to the service module object D 3600; at this time, the data object do_4 can be visited in the service module object D 3600. In spite that 3020 is as same as 3010 in covering manner and covering rule, the aggregation of member objects is different from each other; and simultaneously, the inheritance to the service module object 1510, the covering method of the member object also follows the priority principle of direct inheritance, that is, the member objects inherited through the parent service module mode always prior to the member objects inherited through the linkage mode.

The inheritance mode implemented by the reference to the view description component object 1512 in the linkage abstract service module object 1510 realizes multiple inheritance of the service module object 1510, which is beneficial to realize the packaging and reuse of the service layer component with independent functions, greatly simplifies the development of software systems, reduces the coupling between service modules, and improves the reusability of codes. For example, we define an abstract service module that implements workflow processing. The workflow settings and records of the workflow can be implemented by the data object 1511; in order to implement workflow support for different bills or file processing, just the linkage of a certain view description component object in the workflow service module object is defined, and the data object in the workflow service module object is covered, the processing and record of the workflow service module object to the process point to the data object in the current service module, the content and codes of the workflow service module object do not need to be changed.

Since the service module object resources and the parent (including ancestor) service module object resources that the instance depends on are directly accessible in the instance of the activity service module, the service module object itself is encapsulated.

In addition, In FIG. 3, if the service module object C 3400 is an entity service module object. After creating the instance of the activity service module (assumed as X) according to the service module object D 3500, when calling the view description component object link_1, the instance of the activity service module group object 1400 to which the activity service module object 1410 belongs creates an instance (assumed as Y) of a new activity service module object 1410 according to the service module object C 3400, then all operations to link_1 in X point to Y, view_3 only exists in Y, all members in Y has no any direct relationship with X; and at this time, the instance of the activity service module object 1410 managed by the instance of the activity service module group object 1400 is more than one. When view_3 is loaded to the client-side, the client-sided control engine 1800 will create an instance of the activity service module proxy object 1910 corresponding to Y.

To more clearly reflect the evolution of the service module object 1510 and its member object 1502 from the beginning of the definition until the actual operation of the software system, please refer to FIGS. 1 and 4.

The resource file 4000 defined by the service module is described as follows. The service module object 1510 is created by the service module object factory 1500 according to the files 4100 and cached in the service module object factory 1500; the instance of the public or private service module context objects 1310, 1330 creates the instance of the activity service module group object 1400 and the instance of the activity service module object 1410 according to the service module object 1510. And then according to the client-sided request, the member object of the instance of the activity service module object 1410 is pushed to the client-sided, received and parsed by the client-sided control engine 1800 to create the instance of the corresponding proxy objects 1900, 1910 and 1911, the view component 1912 and other resources 1914. In 4200, the files 4321-4325 of the view description component are finally converted into the view component 1912 for display 4800 by the client-sided request or the server-sided active push mode through the above steps. In FIG. 4, 4200 represents an example of a software project named sample with a service module as a basic component, and is deployed as a source file; there are three service module definitions in the 4200, namely bill 4300, bill_purchase 4400, and bill_sales 4500. Now take the service module bill 4300 as an example to explain.

The service module attribute definition file is module.xml 4301. The access name of the member object is similar to the full name of the class (that is, the file relative path name+file name, without the file suffix name); the data object file is stored in the file directory $do. There is a data object definition file bill.xml 4311, the access name is bill; the view component is stored in the file directory $view, there are five files 4321-4325, the access names are respectively bill.button, bill.content, etc.; There are five class files in the activity files 4331-4335. The corresponding access names are goods.Add, goods.Delete, Add, Edit and Save. The naming method is the same as the full name of the class. In addition, there is $any for storing other resource files. The action-cfg.xml is the configuration file of the service activity, and the content is the access permission setting and lifecycle setting of the service module activity object 1513. If no service activity object is set, the default setting will be adopted. Each first-level subdirectory under the file directory src in the 4200 corresponds to a service module definition, and a module.xml file must exist in the directory, which is the definition of the attribute of the service module object.

In FIG. 4, 4800 is created according to a request from a service module object bill_sales, the bill-sales inherits a service module object bill, the bill-sales itself defines a data object bill 4511 and a view description component bill.free 4524, and covers a member of the service module object bill; finally, a displayed view component 4800 comprises multiple view sub-components, every type component has an own characteristic. For example, bill.dialog 4323 is a dialog box view and comprises a sub-component bill.content 4322, the sub-component bill.content 4322 further comprises 4321 and 4324. When a user requests the bill.dialog 4323, the server-side pushes the bill.dialog 4323, a description text of all sub-components of the bill.dialog 4323 and other related components (such as a data object bill 4511) of the bill.dialog 4323 to the client-side for loading. It is obvious that the view component 1912 of the present invention achieves the display of a view through a componentized technology. Through inheritance, a component reusable ratio of the service module object 1510 is very high. Generally speaking, a degree of similarity between a large number of business logics in software engineering is very high. In the present invention, through defining the service module bill 4300, a member object thereof can be inherited and used by all bill-type sub service module objects, such as a service module sales order 4500 and a purchase order 4400. The sub service module object only needs to cover differentiated members to meet demands. For example, Save method in which contents of various documents are different, the contents and logics are generally checked before Save, so that different Check methods are needed to be defined in the sub service module (Check method is called in Save method). As a result, the sub service module does not need to define the service module activity Save again, as well as Add and Edit. Through defining the data object bill 4511, the data object bill 4311 is covered, all operations of all member objects (including inherited member objects) in the sub service module bill_sales 4500 for bill point to bill 4511, and simultaneously, the data object bill 4511 defined by every sub service module points to different data tables in the database, so as to achieve differentiated data access and processing. Authorization of the Add, Edit, and Save methods only needs to be defined in the service module activity configuration 4102 (corresponding files 4302, 4502) in the sub-service module object, and the code does not need to consider authorized access, for further separating the judgment of program codes on the authorization, so that the complexity of the program codes is reduced, the design of the software system is clear and easy to be expanded, the development process is extremely simple, the code amount is scarce, thus the development efficiency is greatly improved, which is hard to imagine in the traditional mode.

In addition, it can be seen from 4200 in FIG. 4, that the software engineering sample is deployed as a source file, and the server-sided service module object factory provides a real-time class compiler for Java classes. When a call request is issued to the service module activity 1513 in the service module object 1510, the service module object 1510 first searches in the cached service activity instance, if the instance of the service module activity object 1513 does not exist, the query is performed to 4000, and then the searched class file is submitted to a compiler for compiling, and finally class bytecode is obtained. Since the instance of each service module object has a class loader, the instance of the service module object 1510 load the Class loader owned by the class bytecode obtained by compiling and returns to Class object; and then according to the Class object, a class instance object is created and cached. For a request from the service module activity 1513, according to the instance, a new instance is cloned and returned to be called; these instances are managed by an instance of the activity service module object 1410 according to a lifecycle property setting of the service module activity configuration 1515. If the content of a service module object 1510 needs to be updated in real time, only the instance of the service module object 1510 needs to be released and re-created. After that, all requests for the service module object 1510 and its member object will point to the new one, so that the local update capability of the software system is achieved. This kind of update method provide a practical solution for partially updating the software system function or bug without stopping the machine, and has a huge commercial value. Simultaneously, this method also provides a real-time operation environment for real-time development, iterative modification and testing of software system development; it only needs to submit source codes, has no need for compiling, restarting the software system, redeploying and releasing, and especially provides a shared real-time development, iterative modification and testing for team development and there is little difference between development members; this development efficiency is unmatched by traditional models. It can be seen that the software system provided by the present invention capable of supporting source code deployment and partial update opens up a new idea and a solution for developing Paas (Platform as a Service), and is significant for promoting the development of PaaS and SaaS (Software as a Service).

To more clearly reflect the working process of the engineering software sample in FIG. 4, a detailed explanation with reference to FIGS. 1 and 5 is described as follows.

As shown in FIG. 5, it is supposed that the server-sided system has been started, the user has completed the login operation and has all the authorizations; the client-side makes a request to the server-side; in parameters of the web address bar, module=bill_sales is the name of the activity service module group (when initializing, the activity service module instance name does not need to be set and has a default as same as the name of the activity service module group); the function of the web page file Work.jsp 5011 is configured to push related resource libraries (such as js resource files) to the client-side, wherein the js resource files can load and start the client-sided control engine shown in FIG. 1, 1800; after completing loading the client-sided control engine, according to parameter module=bill_sales, an initialization request is sent to the server-side. The web server transfers the initialization request to the service module control engine 1300, the service module control engine 1300 searches the instance of the user context object 1330 and transfers the initialization; the instance of the private activity service module context object 1330 creates the instance of the activity service module group object 1400, the activity service module group object 1400 creates the instance of a same named activity service module object 1410. Due to the initialization request, the instance of the activity service module group object 1400 searches the attribute definition of the service module bill_sales, namely, the initial view component name (assumed as desk), the instance of the activity service module group object 1400 searches the view description component desk 4325 in the instance of the activity service module object 1400 according to "desk" (the service module object bill_sales 4500 inherits the service module object bill 4300, so there is the view description component desk), and returns to the client-side after uniformly formatted coding the name of the instance of the activity service module object 1400 added in the static description text of the view description component object 4325. As shown in FIG. 1, the client-sided control engine 1800 decodes according to the returned formatted data, creates the instance of the activity service module group proxy object 1900 and the instance of the activity service module proxy object 1910, and simultaneously, requests the client-sided view factory 1700 to create the view component 1912 and display on a page. As shown in FIG. 5, the button "Test" in 5010 is the content defined by the view description component 4325, wherein 5030 is the script but not the view component.

And then, the user clicks the button "Test" and makes a call request for the server-side, that is, requests to execute the service module activity Add, the script of the button "Test" refers to 5030 in FIG. 5. Through network, the server-sided service module control engine 1300 receives the request, and continues to search 1330, 1400, 1410 and the service module activity 1513 (Add is corresponding to Add.java). After searching the instance of the activity service module object 1410 (if the name of the instance is am), the call 5112 method (such as add.call (am)) is executed on the basis of the instance (if the name of the instance is add) of the service module activity Add which takes the instance of the activity service module object 1410 as a parameter by the instance of the activity service module group object 1400. The call method of the instance Add of the service module activity object 1513 can execute affairs, for example, through the instance of the parameter activity service module object 1410, the instance of the activity data object bill 4511 is obtained, a row of data are added and a data synchronization instruction is executed, and simultaneously, the description text of the view component bill.dialog is pushed to the client-side, such as am.postView ("bill.dialog"). When the instance of the activity service module object 1410 executed the data synchronization and the view component operations, the instance of the activity service module object 1410 registers these operations; after the instance Add of the service module activity object executing the call, the instance of the activity service module group object 1400 analyzes these registered operations and then formatted codes all contents required to be returned to the client-side for outputting, and then clear the registered operation records. While outputting the view component, description texts of all sub components of the view component and related objects (such as data object) are outputted; after the client-sided control engine 1800 obtains the returned formatted data, the client-sided view factory 1700 is requested for creating the instance of the view component object 1912, and then is displayed by the script codes of the 5031 shown in FIG. 5 to obtain the view 5040.

In FIG. 5, the view component object 5040 (whose view name is bill.dialog) comprises four view components, that is, bill.dialog 4323, bill.content 4322, bill.button 4321 and bill.free 4524, wherein the sub component of bill.dialog is 4322, 4322 is a container component whose sub components are 4321 and 4324 (which is covered by 4524), and simultaneously bill.free 4524 is an input component which is related with the data object bill; the bill.free 4524 and the data object bill are performed bidirectional data synchronization through event mode, so that the description texts of these components are all outputted to the client-side for loading, so as to finally obtain the effect of the view 5040.

In FIGS. 5, 1330, 1400 and 1410 make a request in sequence, every low-level object caches the reference of an upper-level object, so that all variants (including HTTP request, response object and parameter) cached by the instance of the activity service module object 1410 can be obtained. The activity service module group object 1400 and the activity service module object 1410 also can create a name space for caching necessary variant information. During the interaction between the client-side and the server-side, the client-sided request comprises but not limited to seven kinds of types, that is, call, selfcall, getado, getview, getany, getpagedata and init, wherein call is a request for executing the service module activity and is corresponding to the external access interface method 5112 in FIG. 5; selfcall is a request for executing the service module activity and is corresponding to the external access interface method 5113 in FIG. 5; getado is a request for obtaining the definition and row data (the client-sided control engine creates the activity data proxy object according to the returned definition and row data) of the activity data object (the client-sided control engine requires the client-sided view factory to create the view component according to the returned description text; getview is a request for obtaining the view description component object; getany is a request for obtaining other resources, getpagedata is a request for obtaining the paging data of the activity data object; init is a request for executing the initialization operation (namely, the default action when initializing a page request. In 5031 of FIG. 5, whether it is requesting a resource or executing a call, the object "this" can be used to interact with the instance of the activity service module 1410 corresponding to the server-side, which is because the instance of each activity service module proxy object 1910 of the client-side has an independent running space, and the instance of the view component object 1912 and the instance of the proxy object 1911 of the activity data object have corresponding positioning information, and the positioning parameters (the name of activity service module group and the name of activity service module) are automatically by the issued request formed after the client-sided control engine (FIG. 1 1800) parsing, and then data and requests are sent to the server-side, which is also a unique advantage of the service-oriented module software system. This resource request automatic positioning method further simplifies the client-sided script programming, and also eliminates the need for programmers to care about naming conflicts that may result from complex applications on the client-side or server-side, for eliminating complex access positioning and write-back positioning settings and reducing system overhead and development workload, thus the implementation is simpler, and it is only needed to care about the business logic in the service module.

Also, the present invention provides an operation method of the software system shown in FIG. 1, referring to FIGS. 1 and 5, which comprises steps of:

(S1) a server-side of the software system starting, loading a service module control engine 1300 of a server-sided system architecture 1200, creating an instance of a public activity service module context object 1310, completing an initialization operation, and waiting a client-sided or other external requests;

(S2) initializing the client-side, starting a client-sided control engine 1800 of a client-sided system architecture 1100, performing another initialization operation according to a name of an initialization service module, and turning to (S4);

(S3) the client-sided performing related operations (such as performing a submission operation after inputting data on an interactive view), making a request for the client-sided control engine 1800 as required, the client-sided control engine 1800 uniformly coding parameters and formatted data which need to send a request for a server-side, and then sending to the server-side through (S4), wherein:

in 5040 of FIG. 5, after inputting data information in 5042, 5043 and 5044, the operating user clicks a button Save 5041 to request the server-side for calling a service module activity Save, here, script codes of the button Save 5041 is as follows:

this.request ('call', 'Save', '', null);

since a client-sided view component bill.free 4524 is event bound with an instance of an activity data proxy object 1911, the data inputted by the view input components 5042, 5043, 5044 are cached in the instance of the activity data proxy object bill 4511, and the bill simultaneously records a modification flag of each data unit; the third parameter "bill" of the above script is a data object name, and the script is parsed by the client-sided control engine (FIG. 1 1800), and modified data of the instance bill 1911 of the activity data proxy object are formatted coded and then sent to the server-side while requesting for calling the service module activity;

(S4) the client-sided control engine 1800 requesting for the server-side (such as request for the view description component 1512, data object 1511 or other resources 1414, request for executing the service module activity 1413), and sending data to be sent to the server-side through network, wherein requested parameters comprise an activity service module group object name, an activity service module object name, a type of requested actions, a name of requested actions and other parameters;

(S5) the server-side responding the client-sided or other external requests, and transferring the client-sided or other external requests to a server-sided service module control engine 1300, the server-sided service module control engine 1300 searching a service module object 1510 in a service module object factory 1500 according to a name of the requested activity service module group, turning to (S18) if the service module object does not exist (namely, abnormally completing);

(S6) judging a name of a public identifier of the searched service module object 1510, if the name is logically NOT, the service module control engine 1300 searching an instance of a corresponding private activity service module context object 1330 according to a user session ID and transferring a request; if the name of the public identifier is logically TRUE, transferring the request to an instance of a public activity service module context object 1310 for performing, and turning to (S10);

(S7) according to the name of the requested activity service module group, the instance of the private activity service module context object searching the instance of the activity service module group object 1400, and turning to (S14) if the instance exists;

(S8) if the instance does not exist, according to access settings, the instance of the private activity service module context object 1330 performing authority authentication, and turning to (S16) if the authority authentication is failed (only exception information is returned);

(S9) according to a corresponding same named service module object 1510, the instance of the private activity service module context object 1330 creating an instance of the activity service module group object 1400 and caching, and then turning to (S12);

(S10) according to the name of the requested activity service module group, the instance of the public activity service module context object 1310 searching an instance of the activity service module group object 1400, and then turning to (S14) if the corresponding instance exists;

(S11) according to the corresponding service module object 1510, the instance of the public activity service module context object 1310 creating an instance of the activity service module group object 1400 and caching;

(S12) while being created, the instance of the activity service module group object 1400 simultaneously creating an instance of a same named activity service module object 1410 and caching the instance in the instance of the activity service module group object 1400 according to the corresponding service module object 1510;

(S13) the context object (the private activity service module context object 1330 or the public activity service module context object 1310) where the instance of the activity service module group object 1400 is performing initialization operation on the instance of the activity service module group object 1400 (namely, performing initialization service module activity); after completing the initialization, transferring the client-sided request or other external access requests to the instance of the activity service module group object 1400;

(S14) the instance of the activity service module group object 1400 further processing the client-sided request or other external access requests, and searching an instance of the activity service module object 1410 to be requested in an own object according to the name of the requested activity service module; and then turning to (S16) if the instance does not exist (only exception information is returned);

(S15) the instance of the activity service module group object 1400 receiving, encoding and parsing the transferred data, driving the instance of the activity data object 1411 to which the instance of the activity service module object 1410 belongs to perform data synchronization and reception; according to the access request, separately or simultaneously executing a designated name service module activity in the instance of the activity service module object 1410, wherein:

the service module activity is an action or instruction that the software system runs, and can exist as a server-sided program file, such as Add.java 4333 which is shown in 4200 of FIG. 4; the service activity name is the full name of the class, for example, the service activity name of goods.Add.java 4331 file is goods.Add, here is java project source file; while being called, the class compiler provided by the server-sided service module object factory compiles and executes in real time (also can be class file, directly loading); In FIG. 15, 5100 interface is the interface that every service module activity object must achieve, so as to ensure that every service module activity object can use cloning method to quickly create instances; while executing the service module activity, the executed service module activity object 1513 must achieve the external access interface which is shown in 5110 of FIG. 5; there are two external calling method: 5112 and 5113, wherein 5112 is corresponding to the request type "call", which means that after completing the service module activity, the activity service module group object 1400 automatically searches components and data which are needed to be returned to the client-side, and then uniformly codes, and then uniformly outputs; 5113 is corresponding to the request type "selfcall", which means that the programmer himself controls the content to be output to the client-side here, this method is generally used when outputting unformatted data, such as outputting images and file streams; before executing the call method 5112 or 5113 of the service module activity object, before method 5111 is firstly executed, after the call method is executed, after method 5114 is executed; the system log information can be recorded in before and after, but before has an important function that the instance of the activity data object 1411 is opened here, allowing the instance of the specified activity data object 1413 to receive data; factually, the instance of the activity data object 1411 in the activity service module instance 1410 is always in a data state that prohibits receiving client-sided or external access delivery, which is considered for security; only if the user has authorization to execute the service module activity object 1413, and when the instance of the specified activity data object 1411 instance is opened in before, the instance of the activity service module group object 1400 allows the instance of the activity data object 1411 to receive and synchronize the modified data sent by the client-side, and the receiving process is automatically completed (including data type conversion) by the instance of the activity data object 1411, but the programmer can intervene; after the call method is executed, the instance of the activity data object that has been opened is automatically closed to the outside; this closed mode can prevent the damage caused by illegal attacks and improve the security state of the system;

(S16) after the instance of the activity service module group object 1400 finishing processing the client-sided request or other external access requests, according to the request type and the execution of the service module activity, uniformly formatted coding the description text (such as json, xml formatted text) formed by the member object owned by the requested and actively pushed activity service module object 1410, the data in the activity data object, the exception information and other resources, and then outputting to the client-sided or other external access interfaces;

(S17) according to the returned data by the server-side, the client-sided control engine 1800 decoding and parsing; according to the view description text, driving the client-sided view factory 1700 to create the instance of the designated typed view component object 1912; according to the data object description text, creating the instance of the activity data proxy object 1911 and loading the corresponding data transferred from the instance of the sever-sided activity data object 1411, and caching into the instance of the activity service module proxy object 1910 of the instance of the client-sided activity service module group proxy object 1900; generating, caching or executing a returned script and loading other resources; after completing loading the data of the instance of the activity data proxy object 1911, driving the data change event of the instance of the activity data proxy object 1911 to execute, the view component object 1912 responding, and triggering the drawing method of the instance of the view component object 1912 to draw the view; and (S18) completing the first interaction, and a next session turning to (S3).

Figure 6:
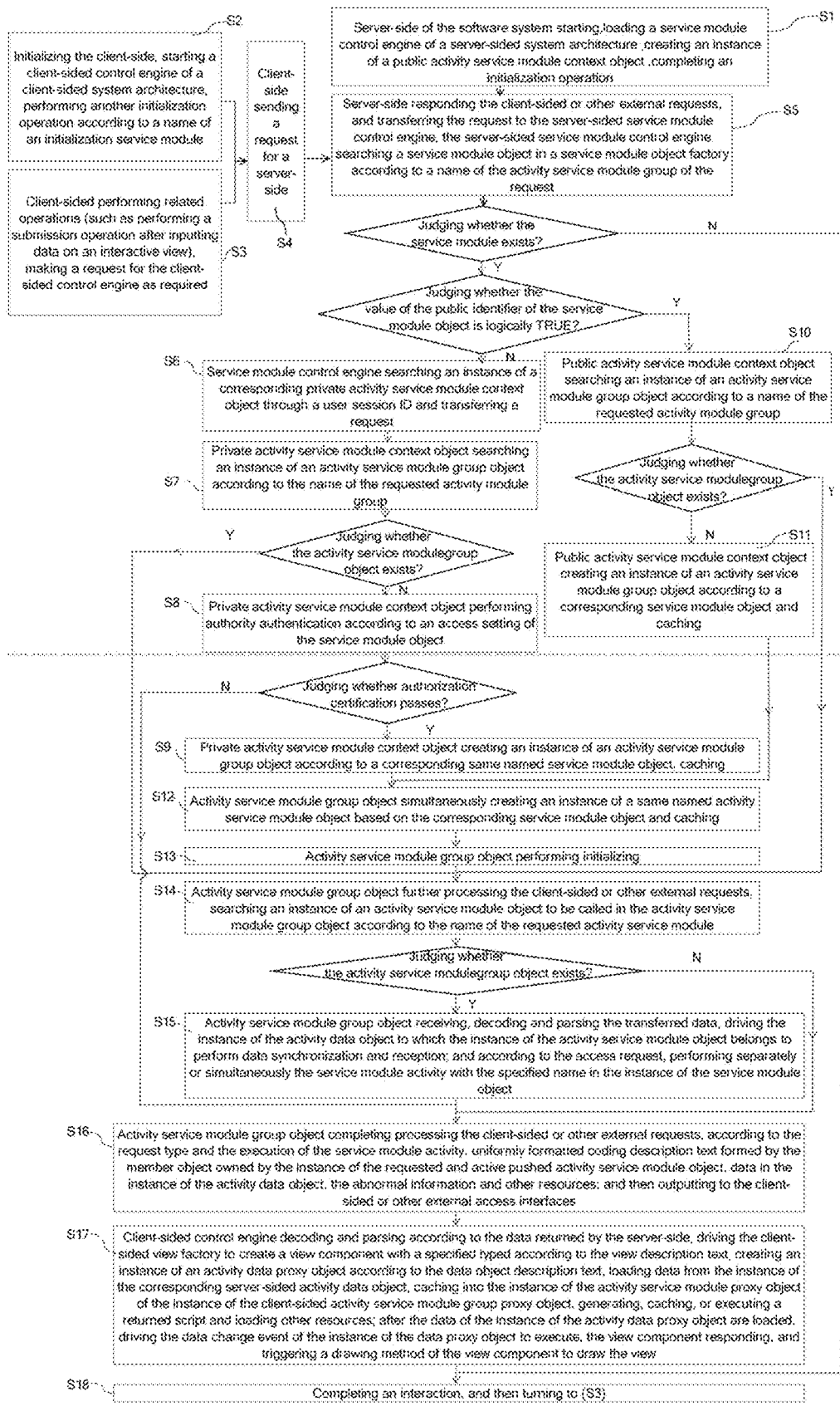
FIG. 6 is a flow chart of an operation method of the service module-oriented software system provided by the present invention.
Figure 6A:
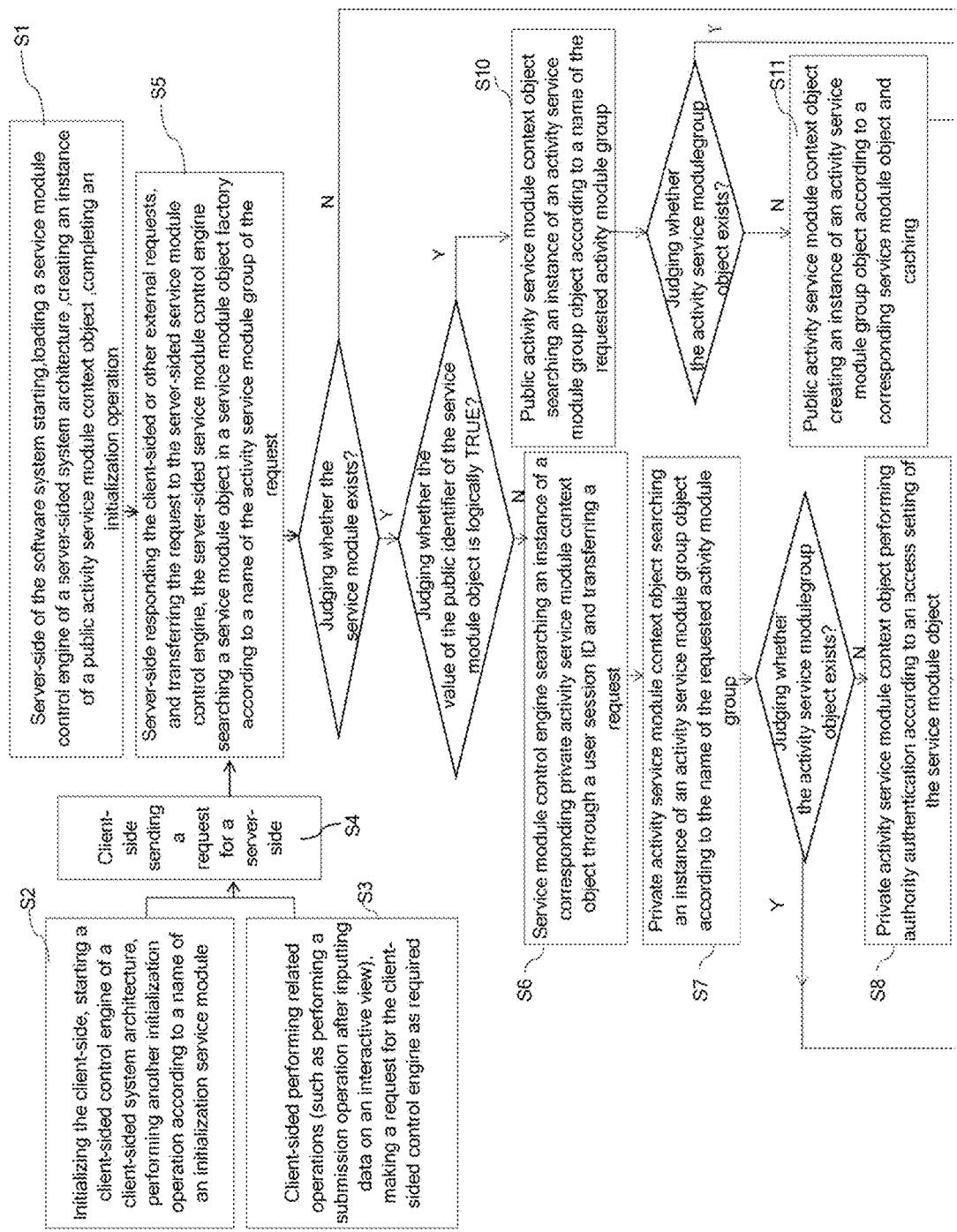
FIG. 6A is an enlarged view of a portion at one side of a dashed line in FIG. 6.
Figure 6B:
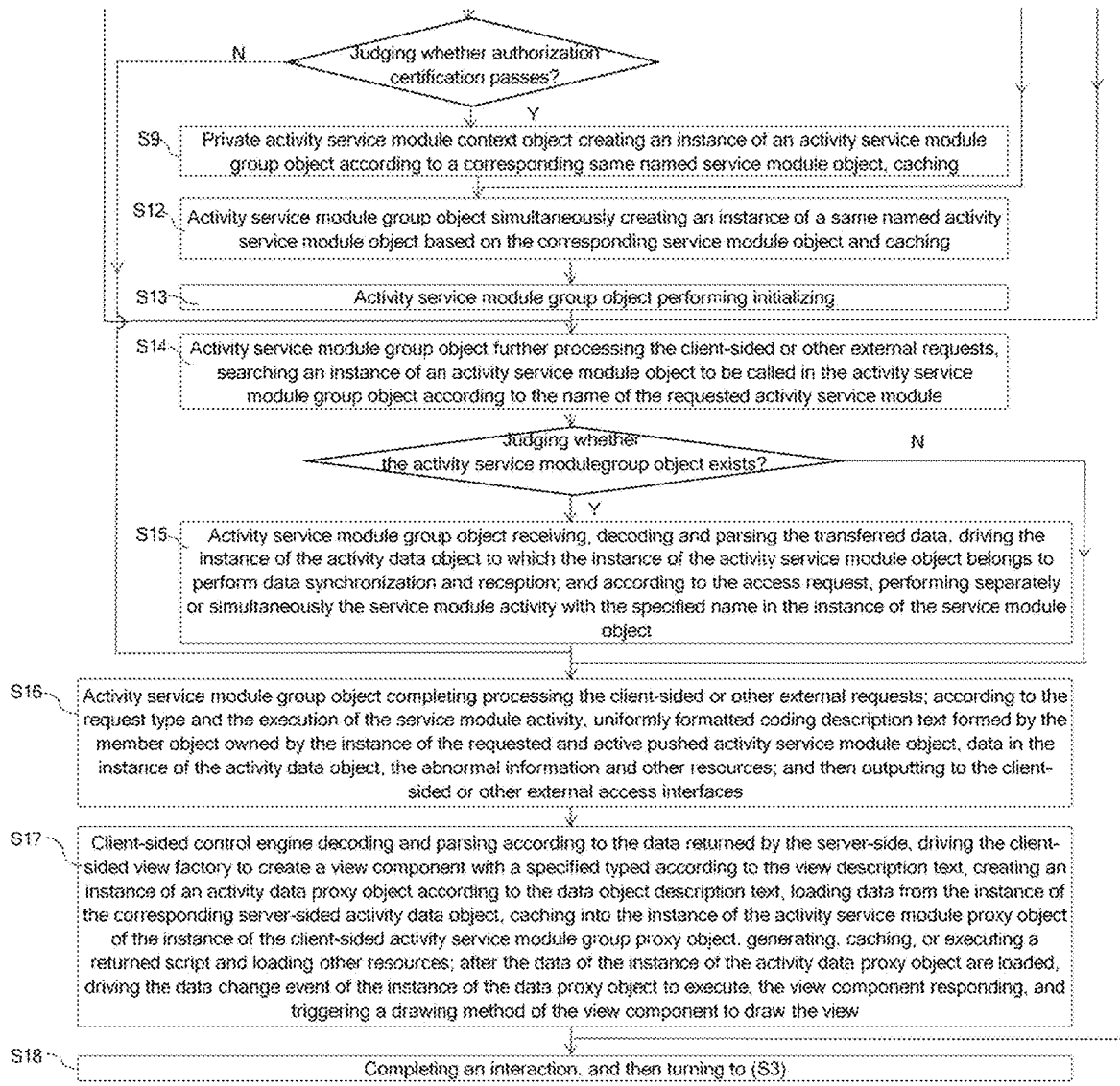
FIG. 6B is an enlarged view of another portion at another side of the dashed line in FIG. 6.

According to the present invention, in the steps of (S3), (S15), (S16) and (S17) shown in FIG. 6, the data synchronization, data interaction, data encoding and decoding methods of the instance of the client-sided activity data proxy object bill 1911 with the instance of the corresponding client-sided activity data object bill 1411 comprise:

data row synchronization, wherein row data of the instance (1911 in FIG. 1) of the activity data proxy object 1911 of the client-sided system architecture 1100 are corresponding to row data of the instance (1411 in FIG. 1) of the activity data proxy data of the server-sided system architecture through a dynamically generated unique row identifier, the row identifier is assigned by the instance of the server-sided activity data object 1411; as the identification basis for the row data synchronization, the row identifier is always incremented upward and will not be repeated; for example, the activity data object proxy bill (4511 in FIG. 4) firstly fills 10 rows of data, values of the row identifiers are respectively from 1 to 10, if this result set is cleaned and refill 10 rows of data, the values of the row identifiers are respectively from 11 to 20, and so on; this processing method not only ensures the correctness of the correspondence of data rows, but also avoids the possibility of sensitive primary key value leakage in the database, and the correspondence is also more secure and reliable; the row identifier is assigned by the instance of the server-sided activity data object 1411, which means that the data rows cannot be added by the client-side, but can only be added by calling the service module activity, and synchronized to the client-side by using the synchronization instruction on the server-side, which further improve the data security of data;

the data object of 1511 in FIG. 5 can specify the data column structure and synchronized column data of the instance of the client-sided activity data proxy object 1911 by setting the property "synchronize column name", for example, the data object of 4311 shown in FIG. 4, if the data column names BillID, SaleDate, Customer, TotalCharges, TotalTaxes exist, "synchronize column names" are respectively set to "SaleDate, Customer, TotalCharges and TotalTaxes", and the data column BillID only exist in the instance of the activity data object 1411 on the server-side; in spite that BillID is the primary key of the data table in the database, it is not a sign of client-sided and server-sided data row positioning; the value of column BillID is invisible on the client-side and is invalid; the current login user can view the data rows that are queried by the service module activity and cached in the instance of the activity data object 1411; if the client-side illegally changes the request value through some debug type tools, there is no corresponding data row and cannot be queried; in the traditional mode, when the client-side illegally changes the BillID value to submit a query request to the server-side, in order to prevent such an illegal request, the server-side usually needs a large amount of program codes to judge whether the BillID is legal, which not only increases the complexity of the program, but also security issues are difficult to be guaranteed; by setting the attribute "protect column name", the data security is further protected and the programming control is simplified; for example, setting the data column BillDate of the above data object bill as a protection column, then this value can only be modified on the server-side and outputted to the client-side, even if the client-side uses the illegal tool to modify and submit, the instance of the server-sided activity data object 1411 will not accept the modified value.

Preferably, the method for synchronizing the data column data further includes two ways of:

column name-based synchronization in which each row of data uses column names and corresponding values to interact and synchronize data; and sequence-based synchronization in which each row of data uses the letters plus column numbers and the corresponding values to interact and synchronize data.

The advantages and disadvantages of the above two synchronization methods are described as follows:

For example, after the data information is entered in the client-sided view component bill.free 5040, the data are automatically saved to the instance of the activity data proxy object bill 1911 through the event mechanism, when the client-side encodes the data in the bill and sends to the server-side, the data encoding is different in the two synchronization modes:

(1) for column name-based synchronization in which each row of data uses column names and corresponding values to interact and synchronize data;

codes are <row _rowid="1" SaleDate="2018-10-05" Customer="Smith" TotalCharges="105.00" TotalTaxes="105.00"/>

(2) sequence-based synchronization in which each row of data uses the letters plus column numbers and the corresponding values to interact and synchronize data, codes are <row _rowid="1" c0="2018-10-05" c1="Smith" c2="105.00" c3="105.00"/>.

Since there is a column corresponding relationship between the instance of the client-sided activity data proxy object 1911 and the instance of the server-sided activity data object 1411, for example, a column number 1 is obtained after a column name c1 being separated to directly point to a position of data column synchronization, so that the positioning time of the data column is effectively shortened, thereby improving the operating efficiency of the software; and however, in the first method, not only does it transmit a lot of content, but it also needs to search the position of the column based on the column name, which is much slower. When using the serial number-based synchronization method, it is obvious that the transmitted network data traffic can be reduced and the system overhead can be reduced.

Compared with the traditional web page using form interaction with the server, the web page information based on the form Form needs to be downloaded or submitted repeatedly, no matter whether the content is modified or what data has been modified, the number of interactions is large, and the amount of data is large. The software system and the operation method thereof disclosed by the present invention are embodied in reducing the number of network interactions and the transmitted data traffic comprise following contents of (a) to (c):

(a) under the system architecture of the present invention, for the view of the client-sided page, after the client-sided view component is loaded once by using the named component method, the component is cached by the client-sided control engine (unless explicitly removed), and while requesting again, the client-sided control engine is obtained from the client-sided cache, which can greatly reduce the data amount and frequency of the requested view resource; when the data within the view component change, only the instance of the client-sided activity data proxy object 1911 needs to be updated, the content of the corresponding client-sided view component content is updated through the event mechanism;

(b) the data interaction is performed between the row data of the instance of the client-sided activity data proxy object 1911 and the row data of the instance of the server-sided activity data object 1411 through the above-mentioned "sequence-based synchronization", so that the network traffic is much less than the traditional way (generally can be reduced by more than ⅓);

(c) the instance of the client-sided activity data proxy object 1911 can record modified column unit data, so that while submitting the modified data to the server, only the modified content is submitted but all, for example, in the above example, the user modifies the content of TotalCharges field, and the transmitted row data are coded to be:

<row _rowid="1" c2="108"/>,

In the same principle, when the data in the instance of the activity data object 1411 are synchronized to the client-side, the same method is adopted; the amount of data reduced in this way depends on the actual situation, and generally reduces by 10%-90% of the network data volume and even more, which is less than ½ of the total reduction in the traditional way, and saves more traffic when it is repeatedly interacted. In addition, the use of data proxy object 1911 and data synchronization technology on the client-side also enables the other party to automatically make "synchronous" changes when the data of one end change in the heterogeneous environment on the client-side and server-side, this data synchronization method is completely transparent to the programmer and can intervene. For the programmer, as long as the local data are manipulated, the purpose of manipulating the data of the other end is achieved, which greatly simplifies the data interaction control and software programming, and also makes the entire system framework very simple, for further reducing the programmer's dependence on software technology.

Figure 7:
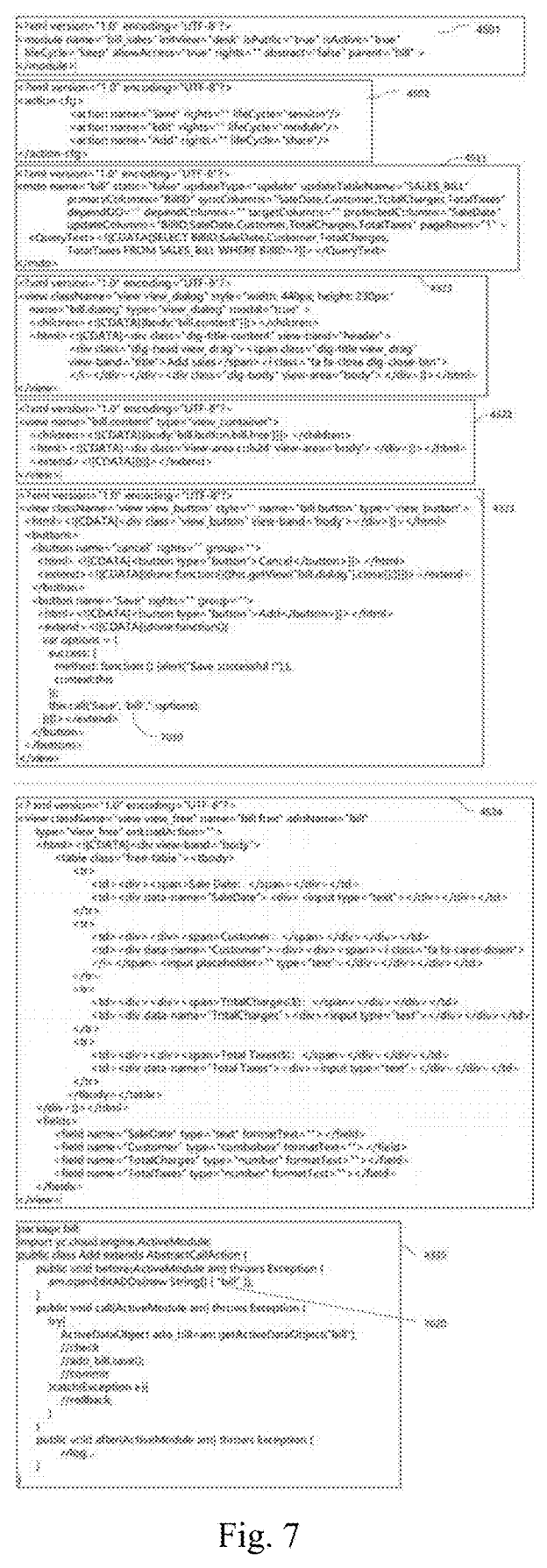

FIG. 7 is an example of the contents of a portion of the files in FIG. 4, to provide a reference for a person skilled in the art to better understand the specific implementation method of the present invention, wherein: 4511 is a data object definition, and a data object is generated on the server-side (FIGS. 4 1511), and 1411 is generated according to 1511, 1911 is generated according to the client-sided request; 4323, 4322, 4321, and 4524 are view description components, are corresponding to 4120, generating different view description component objects 1512, and combining with dynamic information of each activity service module object 1410 to generate 1412; according to the client-sided request, generate description texts; through the client-sided view factory 1700, creating a different view component object 1912; In FIG. 5, 5032 is requesting executing the service module activity Add; in the script of Add object can actively push the view 4323 to the client-side; so that, after completing calling the 5032, the client-sided control engine 1800 creates through 1700 in FIG. 1 according to the returned resource data by calling Add; after these returned resource data are completely processed (including instances and row data of the created and loaded activity data proxy object, 5031 in FIG. 5 is executed, and 4323 (bill.dialog) is displayed; when the description text is formed by the server-sided view component 4323, the view component 4323 requests 4322 bill.content for the service module object according to definition of self attribute children; when 4322 bill.content generates the description text, according to the definition of self attribute children, 4321 bill.button is requested for the service module object, 4524 bill.free generates the description text; when bill.free generates the description text, according to its attribute adoName, the description text of the activity data object bill and row data description text; through this recursive mode, 4323 bill.dialog itself and other sub component description texts are returned to the client-side, and then parsed by the client-sided control engine 1800 to generate various client-sided member objects (including activity service module group proxy object, activity service module proxy object, activity data proxy object and view component object); 7010 means that when the client-side calls the server-sided service activity 1413 Save, the client-side will also send the modified data in the data proxy object (according to FIG. 4 4511) to the server-side, and executes the method before before the method call in the instance Save of the service activity object is called. the method before opens the server-sided instance bill of the activity data object. When the call method is executed, the data passed by the client has been decoded, parsed, and type converted, and loaded into the instance bill of the activity data object; in the figure, 7010 and 7020 are corresponding to each other through the naming.

In the present invention, the software system architecture of the above software structure is a technical framework and implementation strategy, including a running mode, and does not depend on a specific web running environment or a specific language, whether it is a J2EE specification, .net, or other service platforms.

The service model-oriented software system and the operation method thereof provided by the present invention takes the service module as an object. The client-side of the software system generally has only one main page file requested by the name of the service module, as shown in FIG. 5 5011 (but does not exclude using multiple page files). The displayed view varies according to the member object resources defined in the requested service module; the main page files can no longer use the form to interact with the server-side (but does not exclude the use of the form), but are uniformly managed by the client-sided control engine 1100 and the server-sided control engine 1300 of the software system; the overall code amount is greatly reduced compared to the traditional method, the entire system is simple and clear, as long as the release or deployment is once, the subsequent modifications and upgrades do not need to be released or deployed, even without compiling codes, directly submitting source files; the use of these technologies significantly shortens the software release cycle, greatly reduces software development costs and implementation costs, is simple in maintenance and is very easy in secondary development. Because non-forms can be used, pages under traditional technology are avoided from repeated refresh to minimize the network traffic. The view components can provide a good human-computer interactive view, which is more easily accepted by end users; in the software system architecture provided by the present invention, the use of data objects uses multiple levels of security protection and auditing mechanism, shielding the client-side from illegal access to the database and access to sensitive data, and effectively preventing data attacks from the client-sided request or external access requests, has higher performance and security. Due to optimization for data transmission and synchronization, the network interaction traffic is greatly reduced; and in addition, the server-sided system architecture provides a complete resource loading, caching, scheduling, and release scheme for the service module object, the instance of the activity service module object and its member objects, and the instance of the activity service module group object, which greatly reduces the consumption of the server-sided CPU and makes the software system more comprehensive, safer, more stable, more reliable. As a result, the present invention is more versatile in designing, developing, and operating large, complex enterprise applications.

It should be noted that the above embodiments are only used to illustrate the technical solutions of the present invention, and are not limited thereto; although the present invention has been described in detail with reference to the foregoing embodiments, those skilled in the art will understand that the technical solutions described in the foregoing embodiments are able to be modified, or the equivalents of the technical features are replaced by the equivalents of the technical solutions of the embodiments of the present invention. However, these modifications or substitutions are not departed from the spirit and scope of the technical solutions of the embodiments of the present invention.

INDUSTRIAL APPLICABILITY

The service model-oriented software structure and the operation mode thereof are mainly applied to the software system architecture, software operation support platform, software system design, development and testing, and the business logic is divided based on service characteristics and content, and the service module object is a basic unit, supporting component development, integration and customization, focusing on service layer functional packaging, extension and reuse, providing a loosely coupled and open software system architecture, integrating view components, data persistence, data interaction and synchronization, data processing, data access, security protection, independent rights management, integrated solution for life cycle management and scheduling of various service module objects and instances, only need to be released and deployed once, and the amount of program code written and the network interaction traffic while the software is running are greatly reduced compared with the traditional method, has clear software structure, high performance at runtime and high security, is stable and reliable, and easy to learn software system design and development, high development efficiency, low maintenance cost, and easy to be expanded, and can be widely applied. Based on the software architecture of the present invention, the development of the software system only need to create or define various service module objects and their member objects of the service layer of the service system; at the same time, supports the direct submission and, updating, running and testing of the source codes, supports partial updating, expanding software function without stopping the system operation, and provides a real-time updating running environment combined the software development with software test, and especially for large-scale team-based real-time, shared integrated development and test environment, which greatly reduces the development difficulty and cost, as well as test cost, implementation cost and maintenance cost, reduces the dependence of system designers and programmers on traditional technology, and significantly shortens the software development cycle, so it has high industrial applicability.

What is claimed is:

1. A service model-oriented business processing system, which takes characteristics and contents of business requirements to divide business logic and construct service modules, and takes a service module object as a basic unit, wherein the business processing system comprises a service module object structure, a service module object inheritance rule and a system architecture for supporting a service module object to run, wherein the system architecture comprises a server-sided system architecture and a client-sided system architecture;

the service module object structure comprises service module object attribute, member object, service module activity configuration;

the service module object attribute comprises name of service model, name of initial view component, public identifier, activation identifier, life cycle identifier, access verification identifier, authorized alias, abstract service module identifier and name of parent service module;

the member object comprises data object, view description component object, service module activity object and other resource objects, wherein the data object is description of service entity, the view description component object is definition of various types of views on a client-side, the service module activity object are command actions for system internal, client-side, and system external access;

the service module activity configuration are property settings for service module activity object owned or inherited by the service module object and comprise service activity name, access authorization name and lifecycle attribute;

the service module object inheritance rule comprises direct inheritance and indirect inheritance, wherein:

the direct inheritance means that the service module object is inherited by specifying a name of parent service module for the service module object; when the name of parent service module is specified, a sub service module object inherits all member objects of the specified parent service module object; when the sub service module object has member objects with same types and names with the parent service module object, the component objects with the same types and names of the parent service module object are covered;

the indirect inheritance means that the service module object is inherited through the view description component object defined in the service module object and linked with other abstract service module objects; while defining the view description component object linked with other abstract service module objects for the service module object, component objects related with the linked abstract service module object are aggregated to a current service module object; when the current service module object including a service module object obtained by direct inheritance has member objects with same types and names with the linked abstract service module object, the member objects of the linked abstract service module object with the same types and same names are covered, which is as same as a covering method of specifying the name of parent service module and comply with member object precedence principle of the direct inheritance, so that the indirect inheritance realizes multiple inheritance of the service module object;

based on the rule, the service module object autonomously parses and loads the member objects owned by the service module object for external or internal access and call by the service module object;

the server-sided system architecture provides a complete resource loading, caching, scheduling and release scheme for the service module object, an instance of an activity service module object and member objects thereof, and an instance of an activity service module group object, which greatly reduces a consumption of a server-sided CPU and makes the business processing system safe, stable and reliable.

2. The service model-oriented business processing system, as recited in claim 1, wherein:

the server-sided system architecture comprises:

a service module object factory configured to search service module definition in the business processing system based on a name of service module and provide class compiling services; according to searched resource files or resource data, to create and manage a service module object, wherein: when creating the service module object, a member object defined in the service module object is simultaneously created and service module activity configuration information is read out;

a service module control engine configured to receive client-sided or other external accesses, provide session security authentication service, uniformly manage (including query, create, cache, call, and release) an instance of a private activity service module context object and an instance of a public activity service module context object, wherein: a service module object is searched from the service module object factory according to a name of an activity service module group of an access request, if the public identifier of the service module object is logically FALSE, the instance of a corresponding private activity service module context object is searched according to a user session ID, and the access request is transferred to the instance of the private activity service module context object for processing; if the public identifier of the service module object is logically TRUE, the access request is transferred to the instance of the public activity service module context object for processing;

a private activity service module context object, wherein: the instance of the object is created when a user logs in successfully (generally cached in an HttpSession object), the object implements an authentication interface for all permissions owned by the logged-in user, and caches private information of the logged-in user or other information related to the logged-in user; according to the request, the instance of the private activity service module context object automatically creates, caches, manages and calls the instance of the activity service module group object, if the instance does not exist, the access authorization authentication is performed according to the service module object (with same name) corresponding to the name of the requested activity service module group, if the authentication is passed, an instance of an activity service module group object is created according to the service module object and is cached in the instance; and simultaneously, a client-sided or other external access request is transferred to the instance of the activity service module group object;

a public activity service module context object, wherein: when a service module control engine starts, an instance of a public activity service module context object is created for managing instances of all activity service module group objects whose public identifier is logically TRUE; when the request transmitted by the service module control engine is accepted, the instance of a corresponding activity service module group object is automatically searched, and the client-sided or other external access requests are transmitted to the instance of the activity service module group object whose processing manner is as same as the instance of the private activity service module context object, but no any authorization authentication is performed;

an activity service module group object which is created by the instance of the private activity service module context object or the instance of the public activity service module context object according to the client-sided or external request, for accepting the client-sided or other external requests transmitted by the instance of the corresponding private activity service module context object or the instance of the public activity service module context object, for decoding and parsing data from the client-sided or other external access requests to further processing, wherein: when the instance of the activity service module group object is created, the instance of the activity service module group object creates and caches an instance of an activity service module object according to the same named service module object, that is, the instance of the activity service module group object must have the instance of a same named activity service module object; according to a name of an activity service module of the client-sided or other external access requests, the instance of the activity service module group object searches the instance of the cached activity service module object, and continues to process the access request, for example, the instance of the previously parsed data drive the activity data object to which the instance of the activity service module object belongs for performing data synchronization and reception, and executing the service module activity with the specified name in the instance of the activity service module object separately or simultaneously according to the requested action type; according to the request type and the execution of the service module activity, the description text, data, exception information and other resources of the member object owned by the instance of the requested and active pushed activity service module object are returned, and then are outputted to the client-sided or other external access interfaces after performing unified format encoding; and an activity service module object which is created and cached in the instance of the activity service module group object by the instance of the activity service module group object according to the service module object with a same name defined in the system, and is scheduled and managed by an instance of a corresponding activity service module group object, wherein: the instance of the activity service module object contains the instance of a service module object with the same name, and the member object owned by the instance of the activity service module object is from the member object defined and inherited in the corresponding service module object; the instance of the activity service module object creates and manages the activity data object based on the data object in the service module object, and uniformly encodes and outputs various returned resources, data or exception information which are needed to be requested for the client-sided or other external access according to the instance of the activity service module group object; the instance of the activity service module group object further creates and caches an instance of a new activity service module object according to a request for a view description component of another entity service module object linked in the service module object; the request of the client-side to the linked view description component is transferred to the instance of the new activity service module object, the working principle and processing mode of the instance of the new activity service module object are same as those of the instance of the above-mentioned activity service module object; at this time, the instance of the activity service module group object contains instances of multiple activity service module objects, instances of all activity service module objects have an independent running environment and space, but are all in the instance of a same activity service module group object, instances of different activity service module objects can call and communicate with each other through the instance of the corresponding activity service module group object;

the client-sided system architecture comprises:

a client-sided view factory configured to create various types of view components based on format data of various types of view description component objects returned by the server-side, namely, view component for display view on the client-side;

a client-sided control engine configured to process a request on the client-side, uniformly format data to be sent to the server-side, send the encoded format data or other non-format data to the server-side through network, and simultaneously or separately request the resource data and request to call the service module activity, wherein: after completing the request, the data returned by the server-side are decoded and parsed; the view component is created and cached through the client-sided view factory based on the format data of the parsed view description member; according to the parsed data object formatted text, the instance of data proxy object on the client-side is created and cached; the formatted data of the data object are loaded to the instance of the data proxy object; simultaneously, a returned script on the server-side is generated, cached or executed and the view component display is driven; other returned resources are loaded according to specific types;

an activity service module group proxy object which is corresponding to the server-sided system architecture, wherein: according to a name of a returned activity service module group from the client-sided request, the client-sided control engine creates and caches an instance of an activity service module group proxy object, and simultaneously creates an instance of a same named activity service module proxy object which is cached in the instance of the activity service module group proxy object; the instance of the activity service module proxy object caches and manages the instance of the client-sided member object which comprises instance of activity data proxy object, view component object and other type data;

an activity service module proxy object, wherein an instance of an activity service module proxy object is cached in the instance of the activity service module group proxy object and is corresponding to the instance of the activity service module object on the server-side by naming access; the activity module proxy object is configured to cache and manage the instance of the activity data proxy object, view component and other resource data on the client-side, and accessing by naming;

an activity data proxy object for implementing client-sided data persistence management, which serves as a data source displayed by the view component, corresponds to an instance of a same named activity data object in the activity service module object, and row data in the activity data proxy object comprises partial or all row data of instances of the activity data objects;

a view component object which is various types of view components for displayed on the client-side, and is created by the client-sided view factory based on the formatted text of the view description component returned by the client-side, wherein: the view component object interacts with data of the instance of the activity data proxy object through event driven response mechanism, bidirectionally or unidirectionally response based on characteristics of the view component object; and other resources which are other data besides the instance of the activity data proxy object and the instance of the view component object in the instance of the activity service module proxy object.

3. An operation method of a service model-oriented business processing system, which comprises steps of:

(S1) starting a server-side of the business processing system, loading a server-sided service module control engine, creating an instance of a public activity service module context object, and completing an initial operation;

(S2) initializing a client-side, starting a client-sided control engine of a client-sided system architecture, performing an initialization based on an initial service module name, going directly to (S4);

(S3) the client-side performing related operations, proposing a request for the client-sided control engine according to needs, the client-sided control engine uniformly coding parameters and formatted data which are required to be sent a request to the server-side;

(S4) the client-sided control engine sending the request for the server-side, sending data which are required to be sent to the server-side through Internet/Intranet, wherein: parameters of the request comprise activity service module group object name, activity service module object name, activity types, and activity names and other parameters of the request;

(S5) the server-side responding the client-sided or other external request, and transferring the request to the server-sided service module control engine, the server-sided service module control engine searching a service module object in a service module object factory according to a name of the activity service module group of the request; if the service module object does not exist, going directly to (S18); if the service module object exists, when a public identification value of the searched service module object is logically FALSE, continuing to (S6); when the public identification value is logically TRUE, going directly to (S10);

(S6) the service module control engine searching an instance of a corresponding private activity service module context object through a user session ID and transferring a request;

(S7) the instance of the private activity service module context object searching an instance of an activity service module group object according to the name of the requested activity module group; if the corresponding instance is existent, going directly to (S14); if the corresponding instance is inexistent, continuing to (S8);

(S8) the instance of the private activity service module context object performing authority authentication according to an access setting of the service module object; if the authority authentication is not passed, going directly to (S16); if the authority authentication is passed, continuing to (S9);

(S9) the instance of the private activity service module context object creating the instance of the activity service module group object according to a corresponding same named service module object, caching and going directly to (S12);

(S10) the instance of the public activity service module context object searching another instance of another activity service module group object according to the name of the requested activity module group; if the corresponding instance is existent, going directly to (S14); if the corresponding instance is inexistent, continuing to (S11);

(S11) the instance of the public activity service module context object creating the another instance of the another activity service module group object according to a corresponding service module object and caching;

(S12) when the instance of the activity service module group object or the another instance of the another activity service module group object is created, the instance of the activity service module group object or the another instance of the another activity service module group object simultaneously creating an instance of a same named activity service module object based on the corresponding service module object and caching in the instance of the activity service module group object or in the another instance of the another activity service module group object;

(S13) the instance of the activity service module group object which is created by the instance of the private activity service module context object, or the another instance of the another activity service module group object which is created by the instance of the public activity service module context object initializing the instance of the activity service module group object; and after completing the initialization, the instance of the private activity service module context object or the instance of the public activity service module context object transferring the client-sided or other external requests to the instance of the activity service module group object or the another instance of the another activity service module group object;

(S14) the instance of the activity service module group object or the another instance of the another activity service module group object further processing the client-sided or other external requests, searching an instance of an activity service module object to be called in the activity service module group object or in the another activity service module group object according to the name of the requested activity service module; and going directly to (S16) if the instance of the activity service module object to be called is not existent; if the instance of the activity service module object to be called is existent, continuing to (S15);

(S15) the instance of the activity service module group object or the another instance of the another activity service module group object receiving, decoding and parsing the transferred data, driving an instance of an activity data object corresponding to the instance of the activity service module object to perform data synchronization and reception; and according to the access request, executing separately or simultaneously the service module activity with the specified name in the instance of the activity service module object;

(S16) after the instance of the activity service module group object or the another instance of the another activity service module group object completing processing the client-sided or other external requests; according to the request type and the execution of the service module activity, uniformly formatted coding description text formed by the member object owned by the instance of the requested and active pushed activity service module object, data in the instance of the activity data object, the exception information and other resources; and then outputting to the client-sided or other external access interfaces;

(S17) the client-sided control engine decoding and parsing according to the data returned by the server-side, driving the client-sided view factory to create a view component with a specified type according to the view description text, creating an instance of an activity data proxy object according to the data object description text, loading data from the instance of the corresponding server-sided activity data object, caching into the instance of the activity service module proxy object of the instance of the client-sided activity service module group proxy object, generating, caching, or executing a returned script and loading other resources; after the data of the instance of the activity data proxy object are loaded, driving the data change event of the instance of the data proxy object to execute, the view component responding, and triggering a drawing method of the view component to draw the view; and (S18) completing an interaction, and then going directly to (S3).

4. The operation method of the service model-oriented business processing system, as recited in claim 3, wherein:
in the steps of (S5) and (S6), the server-sided service module control engine searches the service module object corresponding to the name of the activity service module group of the client-sided request or other external access requests in the server-sided service module object factory; if the service module object exists, when the public identifier of the service module object is logically TRUE, the request is transferred to the instance of the public activity service module context object; when the public identifier of the service module object is logically FALSE, the service module control engine searches the instance of the corresponding private activity service module context object according to session ID and transfers the request.

5. The operation method of the service model-oriented business processing system, as recited in claim 3, wherein:
the service module activity configuration further comprises name of access authorization;
the operation method further comprises:
when the instance the activity service module group object executes the service module activity, if the request is transferred from the instance of the private activity service module context object, performing authentication by the instance of the activity service module group object on the instance of the private activity service module context object according to the name of access authorization, if the authentication passes, executing the service module activity.

6. The operation method of the service model-oriented business processing system, as recited in claim 4, wherein:
the service module activity configuration further comprises name of access authorization;
the operation method further comprises:
when the instance the activity service module group object executes the service module activity, if the request is transferred from the instance of the private activity service module context object, performing authentication by the instance of the activity service module group object on the instance of the private activity service module context object according to the name of access authorization, if the authentication passes, executing the service module activity.

7. The operation method of the service model-oriented business processing system, as recited in claim 3, wherein:
the service module activity configuration comprises lifecycle attribute;
the operation method further comprises:
a lifecycle type of the service module activity comprises temporary, session, module and sharing;
temporary represents that one instance of the service module activity object is assigned for every call of a specified named service module activity object, and after completing the call, the instance is automatically discharged and released;
session represents during the entire session period between the client-side or external access and the server-side, in instances of a same activity service module object, only an instance is created for the specified named service module activity object; every call point to this instance;
module represents that in the instances of the activity service module object created based on a service module object, only an instance is created for the specified named service module activity object; all calls, for the specified named service module activity object in the instance of the activity service module object created based on the service module object, point to a same instance;
share means that when all users create the instance of the activity service module based on any service module object, all calls for the specified service module activity object point to a same instance.

8. The operation method of the service model-oriented business processing system, as recited in claim 4, wherein:
the service module activity configuration comprises lifecycle attribute;
the operation method further comprises:
a lifecycle type of the service module activity comprises temporary, session, module and sharing;
temporary represents that one instance of the service module activity object is assigned for every call, and after completing the call, the instance is automatically discharged and released;

session is the instance of the activity service module which exists in the entire session period between the client-side and the server-side;

module is the instance of a created activity service module based on a specified service module object;

share means that when all users create the instance of the activity service module based on any service module object, the instance of one service module activity object is shared.

9. The operation method of the service model-oriented business processing system, as recited in claim 3, wherein:
data synchronization, data interaction, data coding and data decoding are achieved through following manners of:
data row synchronization, wherein row data of the instance of the activity data proxy object of the client-sided system architecture are corresponding to row data of the instance of the activity data proxy data of the server-sided system architecture through a dynamically generated unique row identifier, the row identifier is assigned by the instance of the server-sided activity data object; as the identification basis for the row data synchronization; through setting page rows for the data object, the instance of the server-sided activity data object automatically push the corresponding row data in the page range according to a specified page number;
data column synchronization, wherein the data object can specify the data column structure and synchronized column data of the instance of the client-sided activity data proxy object by setting the property "synchronize column name", the data column synchronization comprises two ways of:
column name-based synchronization in which each row of data uses column names and corresponding values to interact and synchronize data; and
sequence-based synchronization in which each row of data uses the letters plus column numbers and the corresponding values to interact and synchronize data.

10. The operation method of the service model-oriented business processing system, as recited in claim 4, wherein:
data synchronization, data interaction, data coding and data decoding are achieved through following manners of:
data row synchronization, wherein row data of the instance of the activity data proxy object of the client-sided system architecture are corresponding to row data of the instance of the activity data proxy data of the server-sided system architecture through a dynamically generated unique row identifier, the row identifier is assigned by the instance of the server-sided activity data object; as the identification basis for the row data synchronization; through setting page rows for the data object, the instance of the server-sided activity data object automatically push the corresponding row data in the page range according to a specified page number;
data column synchronization, wherein the data object can specify the data column structure and synchronized column data of the instance of the client-sided activity data proxy object by setting the property "synchronize column name", the data column synchronization comprises two ways of:
column name-based synchronization in which each row of data uses column names and corresponding values to interact and synchronize data; and
sequence-based synchronization in which each row of data uses the letters plus column numbers and the corresponding values to interact and synchronize data.

11. The operation method of the service model-oriented business processing system, as recited in claim 3, wherein:
script codes of the service module activity support loading source codes, the operation method further comprises:
every service module object uses a self-defined class loader to cache the compiled scripts in the instance of the service module object, the class loader directly load the compiled codes;
when the server-sided service module object factory releases the instance of the service module object, the instance of the class loader is released; when the instance of the named service module object is requested for the service module object factory again, an instance of a new service module object is created, the instance simultaneously uses an instance of a new class loader to ensure that a content of the service module object is timely refreshed, all subsequent requests for service module objects and member objects for this name point to the new instance.

12. The operation method of the service model-oriented business processing system, as recited in claim 4, wherein:
script codes of the service module activity support loading source codes, the operation method further comprises:
every service module object uses a self-defined class loader to cache the compiled scripts in the instance of the service module object, the class loader directly load the compiled codes;
when the server-sided service module object factory releases the instance of the service module object, the instance of the class loader is released; when the instance of the named service module object is requested for the service module object factory again, an instance of a new service module object is created, the instance simultaneously uses an instance of a new class loader to ensure that a content of the service module object is timely refreshed, all subsequent requests for service module objects and member objects for this name point to the new instance.

13. The operation method of the service model-oriented business processing system, as recited in claim 3, wherein:
the instance of every client-sided activity service module group proxy object is corresponding to the instance of one activity service module group object cached in the server-side, and the instance of every activity service module proxy object cached in the instance of the client-sided activity service module group proxy object is corresponding to the instance of the activity service module object cached in the instance of the corresponding server-sided activity service module group object based on naming; a corresponding mode of the instance of the activity service module group proxy object and the instance of the activity service module group object is established by name, unique identifier or combination of name and identifier, but the instance of the activity service module proxy object and the instance of the activity service module object respectively owned by the instance of the activity service module group proxy object and the instance of the activity service module group object are corresponding to each other by naming, and the member object of the instance of the activity service module proxy object and the member object of the instance of the activity service module object are corresponding to each other by naming.

14. The operation method of the service model-oriented business processing system, as recited in claim 4, wherein:
the instance of every client-sided activity service module group proxy object is corresponding to the instance of one activity service module group object cached in the server-side, and the instance of every activity service module proxy object cached in the instance of the client-sided activity service module group proxy object is corresponding to the instance of the activity service module object cached in the instance of the corresponding server-sided activity service module group object based on naming; a corresponding mode of the instance of the activity service module group proxy object and the instance of the activity service module group object is established by name, unique identifier or combination of name and identifier, but the instance of the activity service module proxy object and the instance of the activity service module object respectively owned by the instance of the activity service module group proxy object and the instance of the activity service module group object are corresponding to each other by naming, and the member object of the instance of the activity service module proxy object and the member object of the instance of the activity service module object are corresponding to each other by naming.

* * * * *